US010747861B2

(12) United States Patent
Kim et al.

(10) Patent No.: US 10,747,861 B2
(45) Date of Patent: Aug. 18, 2020

(54) MOBILE TERMINAL AND METHOD FOR CONTROLLING SAME

(71) Applicant: LG Electronics Inc., Seoul (KR)

(72) Inventors: Eunjin Kim, Seoul (KR); Hyeoncheol Cho, Seoul (KR); Kihyeon Kim, Seoul (KR); Youngchan Kim, Seoul (KR); Seungman Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 247 days.

(21) Appl. No.: 15/579,131

(22) PCT Filed: Jul. 14, 2015

(86) PCT No.: PCT/KR2015/007292
§ 371 (c)(1),
(2) Date: Dec. 1, 2017

(87) PCT Pub. No.: WO2016/195156
PCT Pub. Date: Dec. 8, 2016

(65) Prior Publication Data
US 2018/0137266 A1 May 17, 2018

(30) Foreign Application Priority Data

Jun. 2, 2015 (KR) .................. 10-2015-0078081
Jun. 16, 2015 (KR) .................. 10-2015-0085355

(51) Int. Cl.
*G06F 21/32* (2013.01)
*G06F 3/0481* (2013.01)
(Continued)

(52) U.S. Cl.
CPC .............. *G06F 21/32* (2013.01); *G06F 1/163* (2013.01); *G06F 1/1694* (2013.01);
(Continued)

(58) Field of Classification Search
CPC ........ G06F 21/32; G06F 3/0488; G06F 21/35; G06F 1/1698; G06F 1/1694;
(Continued)

(56) References Cited

U.S. PATENT DOCUMENTS 8,805,439 B2 * 8/2014 Kim .................. H04M 1/72577
455/556.1
2014/0028546 A1 * 1/2014 Jeon ........................ G06F 3/014
345/156
(Continued)

FOREIGN PATENT DOCUMENTS

JP  2009-002111    1/2009
JP  2010-242446   10/2010
(Continued)

OTHER PUBLICATIONS

International Search Report in International Application No. PCT/KR2015/007292, dated Apr. 6, 2016, (with English translation) 18 pages.

Primary Examiner — Huan V Doan
(74) Attorney, Agent, or Firm — Fish & Richardson P.C.

(57) ABSTRACT

The present invention relates to a mobile terminal formed to cover a wrist. A mobile terminal according to one embodiment of the present invention comprises: a main body formed to be wearable on a wrist; a display unit arranged on the front side of the main body; an input unit, provided on the main body, for receiving user's voice; and a control unit for controlling the display unit, on the basis of voice information corresponding to the user's voice, so that screen information related to a car is associated with the voice information.

11 Claims, 25 Drawing Sheets

(51) Int. Cl.

| | | |
|---|---|---|
| *G06F 1/16* | (2006.01) | |
| *G06F 21/35* | (2013.01) | |
| *G06F 3/0488* | (2013.01) | |
| *H04M 1/725* | (2006.01) | |
| *H04L 29/06* | (2006.01) | |
| *H04W 12/06* | (2009.01) | |
| *G06F 3/0482* | (2013.01) | |
| *G06F 3/16* | (2006.01) | |
| *G10L 15/08* | (2006.01) | |
| *G10L 15/22* | (2006.01) | |
| *G10L 17/00* | (2013.01) | |
| *G10L 17/22* | (2013.01) | |

(52) U.S. Cl.
CPC .......... *G06F 1/1698* (2013.01); *G06F 3/0482* (2013.01); *G06F 3/0488* (2013.01); *G06F 3/04817* (2013.01); *G06F 3/167* (2013.01); *G06F 21/35* (2013.01); *G10L 15/08* (2013.01); *G10L 15/22* (2013.01); *G10L 17/005* (2013.01); *G10L 17/22* (2013.01); *H04L 63/0861* (2013.01); *H04M 1/7253* (2013.01); *H04W 12/06* (2013.01); *G10L 2015/088* (2013.01); *G10L 2015/223* (2013.01)

(58) Field of Classification Search
CPC .... G06F 3/04817; G06F 3/167; G06F 3/0482; G06F 1/163; H04W 12/06; H04L 63/0861; H04M 1/7253; G10L 17/22; G10L 17/005; G10L 15/22; G10L 15/08; G10L 2015/223; G10L 2015/088
See application file for complete search history.

(56) References Cited

U.S. PATENT DOCUMENTS

| | | | |
|---|---|---|---|
| 2015/0081169 A1* | 3/2015 | Pisz ................. | B60H 1/00657 701/36 |
| 2016/0144826 A1* | 5/2016 | Nelson ................. | B60R 25/241 701/2 |
| 2016/0167486 A1* | 6/2016 | Yang ..................... | B60S 1/08 701/49 |
| 2016/0325754 A1* | 11/2016 | Stahulak ............. | B60W 50/085 |

FOREIGN PATENT DOCUMENTS

| | | |
|---|---|---|
| KR | 10-2012-0116563 | 10/2012 |
| KR | 10-1509596 | 4/2015 |

* cited by examiner

[PARKING COMPLETED]

MOBILE TERMINAL AND METHOD FOR CONTROLLING SAME

CROSS-REFERENCE TO RELATED APPLICATIONS

This application is a National Stage application under 35 U.S.C. § 371 of International Application No. PCT/KR2015/007292, filed Jul. 14, 2015, which claims the benefit of Korean Application No. 10-2015-0085355, filed on Jun. 16, 2015 and Korean Application No. 10-2015-0078081, filed on Jun. 2, 2015. The disclosures of the prior applications are incorporated by reference in their entirety.

TECHNICAL FIELD

The present invention relates to a mobile terminal formed to wrap a wrist.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As the mobile terminal becomes multifunctional, it is implemented as a multimedia player having complicated functions such as capturing images or videos, playing music or videos, playing games, and receiving broadcastings.

Various attempts have been made to implement complicated functions in such a multimedia device by means of hardware or software.

In recent years, the development of a wearable mobile terminal which may be worn on the body in addition to being mainly gripped by a user's hand is actively under way.

Recently, as the development of technologies for controlling a vehicle using a wearable mobile terminal has progressed actively, needs for User Experience (UX)/User Interface (UI) and a method for performing user authentication are emerging.

DISCLOSURE OF THE INVENTION

Therefore, an object of the present invention is to provide a mobile terminal capable of controlling a vehicle using a wearable mobile terminal and a control method thereof.

Another object of the present invention is to provide a mobile terminal capable of controlling a vehicle in an optimized manner using user voice and a control method thereof.

Another object of the present invention is to provide a mobile terminal capable of transmitting a control right for controlling a vehicle to an external terminal and a control method thereof.

Another object of the present invention is to provide a wearable mobile terminal capable of transmitting a control right for controlling a vehicle to an external terminal through an optimized method and a control method thereof.

Another object of the present invention is to provide a mobile terminal capable of providing UI/UX capable of improving security when transmitting a control right for controlling a vehicle to an external terminal and a control method thereof.

Technical Solution

Embodiments of the present invention provide a mobile terminal including: a main body worn on a wrist; a display unit provided on a front surface of the main body; an input unit provided in the main body and configured to receive a user voice; and a control unit configured to control the display unit to display vehicle-related screen information associated with voice information on the display unit on the basis of the voice information corresponding to the user voice.

In an embodiment, different vehicle-related screen information may be output to the display unit on the basis of a keyword included in the voice information.

In an embodiment, when a first keyword is included in the voice information, the control unit may output first vehicle-related screen information associated with the first keyword to the display unit, and when a second keyword different from the first keyword is included in the voice information, output second vehicle-related screen information associated with the second keyword to the display unit.

In an embodiment, the vehicle-related screen information may be output on the basis that the user authentication with the user voice is performed.

In an embodiment, even if the voice information corresponding to the user voice corresponds to voice information associated with specific vehicle-related screen information, when the user authentication with the user voice fails, the control unit may not output the specific vehicle-related screen information.

In an embodiment, the control unit may output different vehicle-related screen information on the basis of user information identified by the user authentication.

In an embodiment, the display unit may output first vehicle-related screen information on the basis that first user information is identified by the user authentication and output second vehicle-related screen information different from the first screen information on the basis that second user information different from the first user information is identified by the user authentication.

In an embodiment, the mobile terminal may further include a communication unit configured to communicate with a vehicle, wherein the vehicle-related screen information may include a plurality of graphical objects respectively associated with a plurality of vehicle-related functions, wherein when any one graphical object among the plurality of graphical objects is selected, in order to allow a function associated with the selected graphical object to be performed in the vehicle, the control unit may transmit a control signal corresponding to the associated function to the vehicle through the communication unit.

In an embodiment, a control signal corresponding to at least one function among the plurality of vehicle-related functions may be transmitted on the basis that user authentication with a user voice is performed.

In an embodiment, a control signal corresponding to a first function among the plurality of functions may be transmitted without user authentication, wherein only when a graphical object associated with the second function among the plurality of graphical objects is selected first after the mainly body is worn on the wrist, a control signal corresponding to a second function different from the first function among the plurality of functions may be transmitted on the basis of user authentication, wherein a control signal corresponding to a third function different from the first and second functions among the plurality of functions may be transmitted on the basis that user authentication is performed each time a graphical object associated with the third function among the plurality of graphical objects is selected.

In an embodiment, when the graphical object associated with the second function is selected first after the main body is worn on the wrist, the control unit may transmit a control signal corresponding to the second function to the vehicle on the basis that the user authentication with the user voice is performed, and in a state where the wearing is maintained, when the graphical object associated with the second function is selected again after the control signal corresponding to the second function is transmitted, the control unit may transmit a control signal corresponding to the second function to the vehicle without the user authentication.

In an embodiment, even if voice information corresponding to the user voice is the same, the control unit may control the display unit to display different vehicle-related screen information on the display unit according to a current time.

In other embodiments of the present invention, a control method of a mobile terminal includes: receiving a user voice; and displaying vehicle-related screen information associated with voice information on a display unit on the basis of the voice information corresponding to the user voice, wherein different vehicle-related screen information is output to the display unit on the basis of a keyword included in the voice information.

In still other embodiments of the present invention, a mobile terminal includes: a main body wearable on a wrist; a communication unit provided in the main body; a sensing unit configured to sense a contact between the main body and an external terminal; and a control unit configured to control the communication unit to transmit a control right capable of controlling a vehicle to the external terminal on the basis that the main body and the external terminal contact each other.

In an embodiment, the external terminal may be able to communicate with at least one of the communication unit and the vehicle, wherein when the vehicle is controlled by the external terminal, at least one of an effective time available to control the vehicle, a type of a control-allowed function among functions executable by the vehicle, a maximum speed of the vehicle, and a movement distance at which the vehicle is able to move may be preset in the control right transmitted to the external terminal.

In an embodiment, the control right transmitted to the external terminal may disappear from the external terminal on the basis that the vehicle enters a state of satisfying a predetermined condition.

In an embodiment, the control right transmission to the external terminal may be performed on the basis that user authentication with biometric information is successful.

In an embodiment, the mobile terminal may further include a display unit, wherein on the basis that the user authentication with the biometric information is successful, the control unit may control the display unit to display screen information corresponding to a state where the transmission of the control right is possible on the display unit.

In an embodiment, while the screen information is output to the display unit, the control right may be transmitted on the basis that the main body and the external terminal contact with each other.

In an embodiment, a graphical object associated with a function for transmitting the control right may be included in the screen information, and when the graphical object is selected, the control unit may transmit the control right to the external terminal.

In an embodiment, when the graphical object is selected, even if the external terminal does not contact the main body, the control right may be transmitted to the external terminal.

In an embodiment, the sensing unit may sense a distance between the main body and the external terminal, wherein the control unit may transmit the control right to the external terminal on the basis that the external terminal exists within a predetermined distance from the main body.

In an embodiment, while the external terminal exits within the predetermined distance from the main body, the control unit may transmit the control right to the external terminal on the basis that at least one of the external terminal and the main body is moved to satisfy a predetermined condition.

In an embodiment, the control right may be transmitted to the external terminal on the basis that at least one of the external terminal and the main body is moved with a first movement satisfying a predetermined condition and may not be transmitted to the external terminal when at least one of the external terminal and the main body is moved with a second movement that does not satisfy a predetermined condition.

In even other embodiments of the present invention, a mobile terminal includes: a main body wearable on a wrist; a communication unit configured to perform short-range communication with an external terminal; a sensing unit configured to sense a movement of the main body; and a control unit configured to transmit a control right capable of controlling a vehicle to the external terminal through short-range communication on the basis that the main body is moved in a predetermined manner.

In an embodiment, the short-range communication may be performed on the basis of at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies.

In yet other embodiments of the present invention, a control method of a mobile terminal includes: sensing a contact between a main body of a mobile terminal and an external terminal; and transmitting a control right capable of controlling a vehicle to the external terminal on the basis that the main body and the external terminal contact each other.

Advantageous Effects

The present invention may output vehicle-related screen information associated with voice information on the basis of the voice information corresponding to a user voice. Accordingly, the present invention may provide screen information for controlling a desired vehicle more conveniently.

In addition, the present invention may output vehicle-related screen information on the basis that user authentication with a user voice is performed. Further, the present invention may significantly improve security by setting a user authentication condition using a user voice for each vehicle-related function.

In addition, the present invention may provide UI/UX that may utilize the vehicle in an optimized state for each user by providing different vehicle-related screen information on the basis of the user information identified by the user authentication.

In addition, the present invention may transmit a control right to the external terminal, which may control the vehicle, on the basis of the contact between the external terminal and the main body. Accordingly, the present invention may provide a user interface that may transmit a control right to an external terminal, which allows the user to more easily control the vehicle.

In addition, the present invention may be configured to perform only some of the functions that may be performed in the vehicle, or may transmit a control right configured to set additional restrictions on the functions that may be performed to the external terminal. Therefore, according to the present invention, when a vehicle is controlled by an external terminal, it is possible to provide a control method for controlling only functions desired by the user among the functions that may be performed in a vehicle to be performed by the external terminal.

In addition, the present invention may significantly improve security by transmitting a control right to an external terminal on the basis that user authentication with biometric information is successful.

MODES FOR CARRYING OUT THE PREFERRED EMBODIMENTS

Figure 1A:
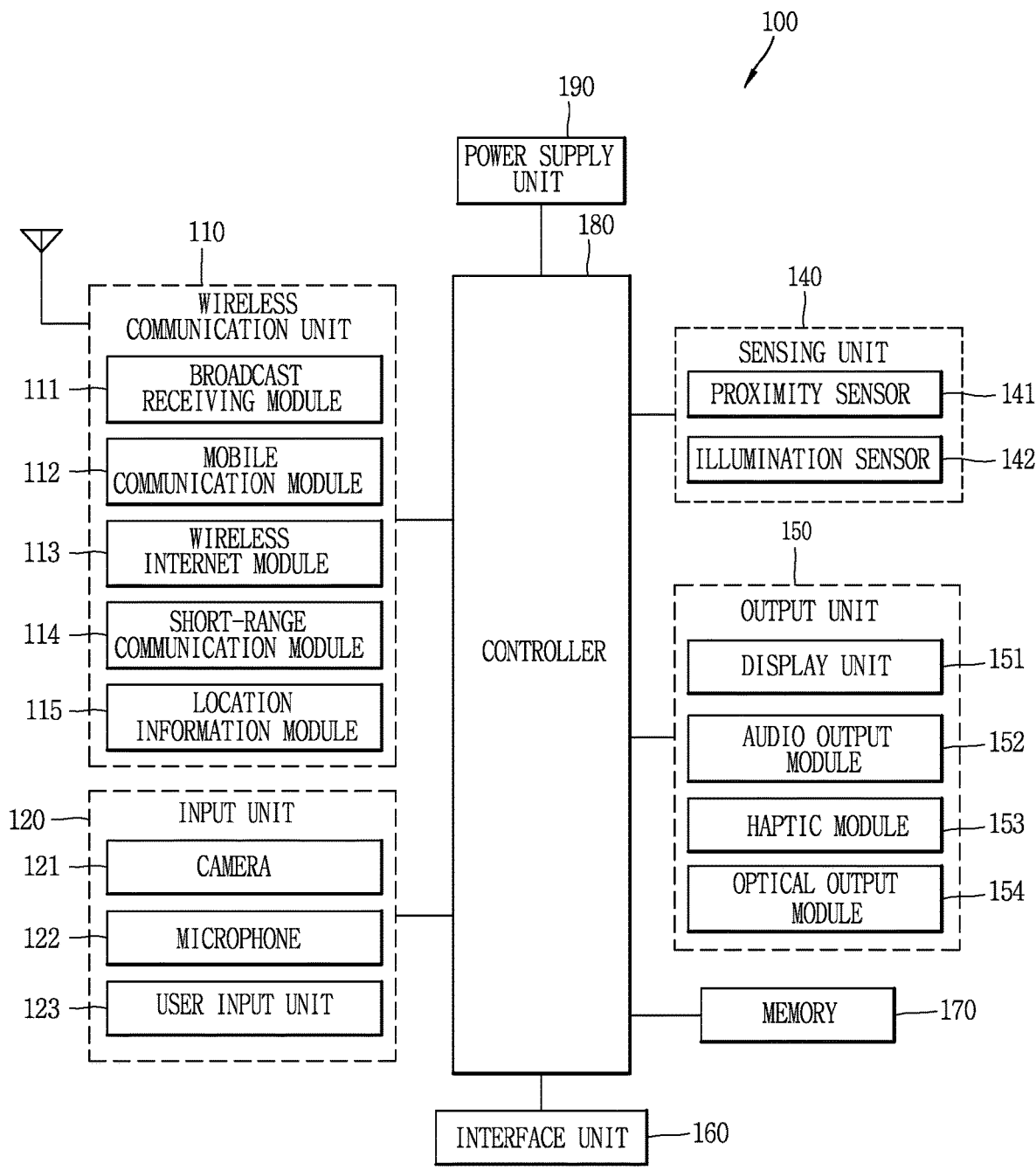
FIG. 1A is a block diagram illustrating a mobile terminal according to an embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
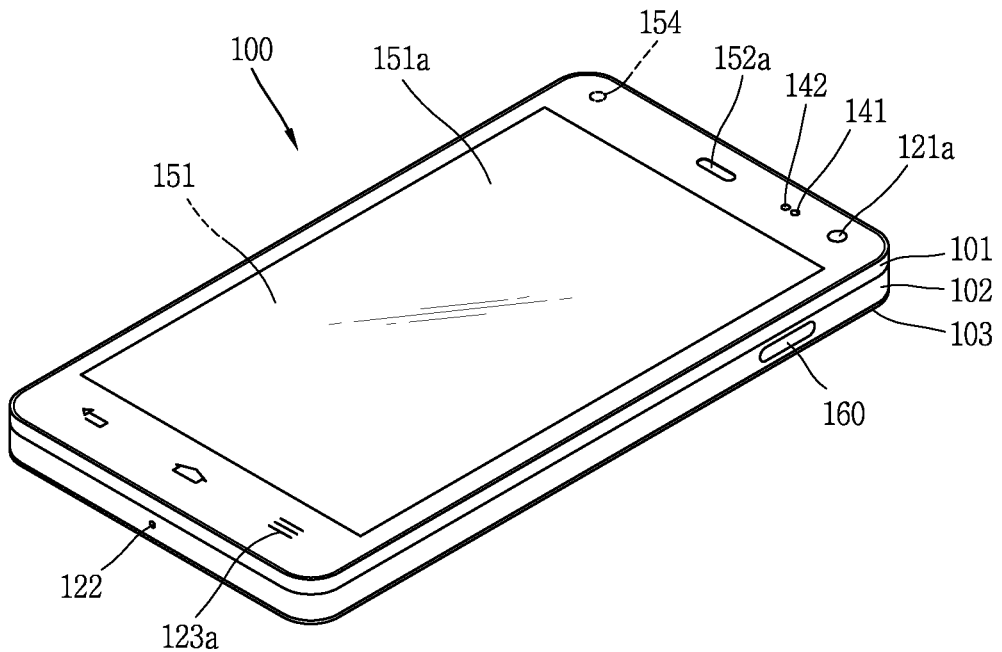
FIGS. 1B and 1C are conceptual diagrams when an example of a mobile terminal related to the present invention is seen in different directions.
Figure 1C:
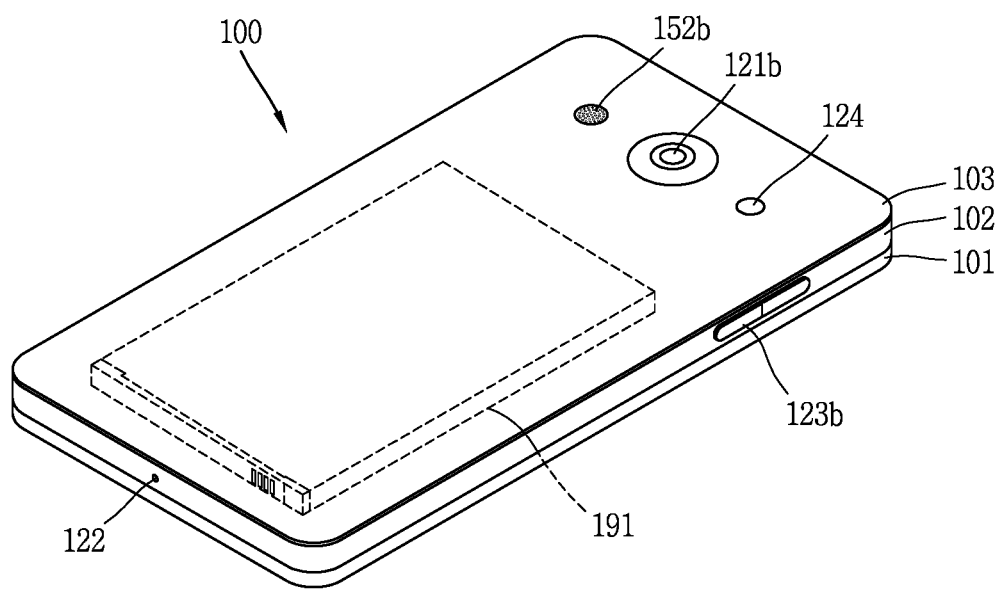

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components, or activating application programs stored in the memory 170.

The controller 180 controls some or all of the components illustrated in FIG. 1A in order to drive an application program stored in the memory 170. Further, the controller 180 may operate at least two of the components of the mobile terminal 100 in order to drive the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a mobile terminal according to various embodiments to be explained later. The operation or the control method for the mobile terminal may be implemented on the mobile terminal by driving at least one application program stored in the memory 170.

Before explaining various embodiments of the mobile terminal 100, the aforementioned components will be explained in more detail with reference to FIG. 1A.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors.

The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The terminal body may be understood as at least one assembly of the mobile terminal 100.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal may be provided with a display unit 151, first and second audio output modules 152a, 152b, a proximity sensor 141, an illumination sensor 142, an optical output module 154, first and second cameras 121a, 121b, first and second manipulation units 123a, 123b, a microphone 122, an interface 160, etc.

Hereinafter, as shown in FIGS. 1B and 1C, will be explained the mobile terminal 100 having the display unit 151, the first audio output module 152a, the proximity sensor 141, the illumination sensor 142, the optical output module 154, the first camera 121a and the first manipulation unit 123a on the front surface of the terminal body, having the second manipulation unit 123b, the microphone 122 and the interface unit 160 on the side surfaces of the terminal body, and having the second audio output module 152b and the second camera 121b on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit.

When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
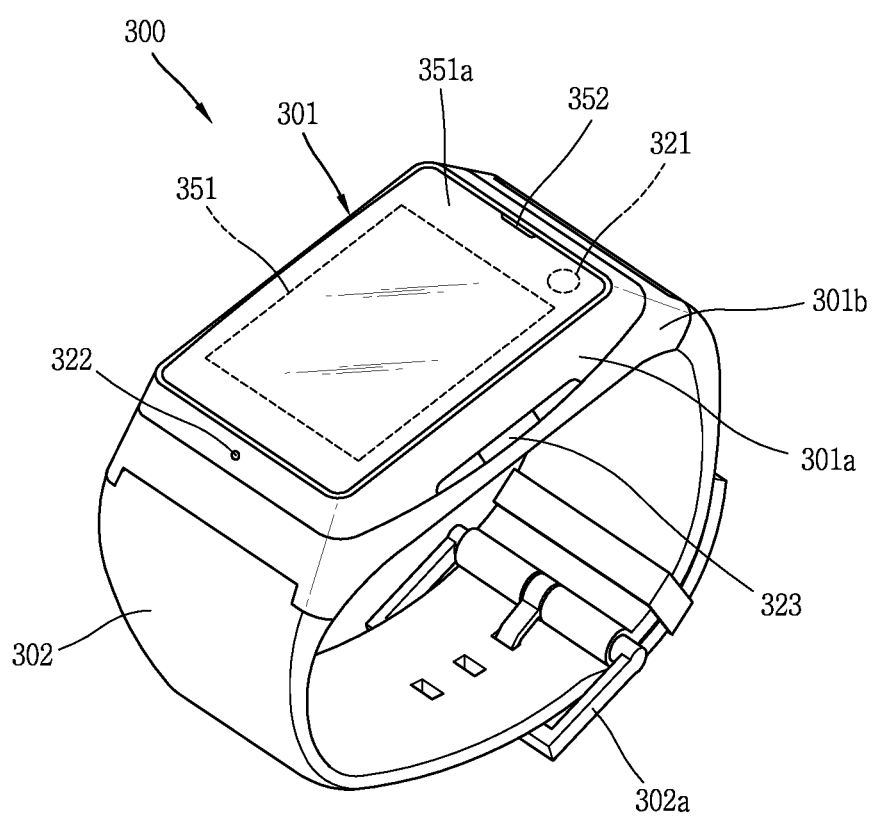
FIG. 2 is a perspective view illustrating an example of a watch type mobile terminal related to another embodiment of the present invention.

FIG. 2 is a perspective view illustrating one example of a watch-type mobile terminal 300 in accordance with another exemplary embodiment.

As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Hereinafter, embodiments related to a control method which can be implemented in the mobile terminal will be explained in more detail with reference to additional drawing figures. It is understood by those skilled in the art that the present features can be embodied in several forms without departing from the characteristics thereof.

Moreover, when description is made with reference to the accompanying drawings, if at least two images in one drawing (FIG. N) are shown in 2 by 2 form, the image shown on the upper left is referred to as the "first drawing", the image shown on the upper right is referred to as the "second drawing", the image shown on the lower right is referred to as the "third drawing", and the image shown on the lower left is referred to as "fourth drawing."

In addition, when four or more images are shown in one drawing (FIG. N), they are sequentially referred to as "first drawing, second drawing, . . . ."

On the other hand, when at least two images in one drawing (FIG. N) are shown in line from the top to the bottom, the images at the top are sequentially referred to as "first drawing, second drawing, . . . ."

In addition, when at least two images in one drawing (FIG. N) are shown in line in a direction from the left end to the right end, the image in the first left end is sequentially referred to as "first drawing, second drawing, . . . ."

A mobile terminal according to an embodiment of the present invention, which may include at least one of the above-described components, may be a watch type mobile terminal as described with reference to FIG. 2. Hereinafter, the mobile terminal of the present invention will be described as an example of a watch type mobile terminal. However, the following description is not limited to the watch type mobile terminal, but may be identically/similarly applied to the mobile terminal described in FIGS. 1A through 1C, the mobile terminal equipped with the flexible display, and various types of wearable devices (e.g., smart watch, smart glass, head mounted display (HMD), etc.).

Hereinafter, the watch type mobile terminal described with reference to FIG. 2 will be described as an example, and reference numerals shown in FIGS. 1A to 1C will be used.

The watch type mobile terminal 100 of the present invention may exchange (or interoperate) data with other terminals. For this, the watch type mobile terminal 100 of the present invention may include the wireless communication unit 110 described with reference to FIG. 1A, and the mobile terminal 100 may exchange data with other terminals and the wireless communication unit 110.

The data communication method between the watch type mobile terminal of the present invention and the other terminal may be various. For example, the data communication may accomplished by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies.

The other terminal may be, for example, a telematics terminal provided in a vehicle. The telematics terminal is provided in a vehicle, and may control an overall operation of the vehicle. For example, the telematics terminal may turn on/off the ignition of a vehicle and control various components (e.g., a navigation device, a camera, an air conditioner for a vehicle, a heater for a vehicle, a music player, a radio, etc.) provided in a vehicle. Also, the telematics terminal may include at least one of the components described with reference to FIG. 1A.

The watch type mobile terminal related to the present invention may control a vehicle through communication with a telematics terminal. Performing a vehicle-related function, which will be described below, may include controlling a vehicle through a telematics terminal, or executing (driving, performing) a particular operation (function) of a vehicle through a telematics terminal.

In addition, the other terminal may be, for example, a mobile terminal (or another mobile terminal) described with reference to FIGS. 1A to 1C. Here, the other terminal may perform communication with a watch type mobile terminal related to the present invention. In addition, the other terminal may control the vehicle through communication with the telematics terminal described above. Hereinafter, another terminal corresponding to the mobile terminal will be referred to as an external terminal.

Meanwhile, in the present invention, a vehicle may be controlled using a watch type mobile terminal. Specifically, the watch type mobile terminal may be provided with a vehicle control function. The vehicle control function may be implemented by transmitting and receiving data to and from a telematics terminal provided in a vehicle through a communication unit provided in the mobile terminal. The telematics terminal of the vehicle receiving the data from the mobile terminal may control the vehicle to perform a function corresponding to the received data.

Here, the vehicle control function may be performed assuming that a control right capable of controlling the vehicle is set. Specifically, the watch type mobile terminal related to the present invention may have a control right capable of controlling a vehicle. When the control right is set, the watch type mobile terminal 100 may perform a vehicle control function on the basis of a user request.

Meanwhile, in the present invention, a mobile terminal may be used to interoperate (communicate) with a vehicle. At this time, user voice may be used for interoperating with the vehicle. Hereinafter, a method of controlling a vehicle using a mobile terminal related to the present invention will be described in more detail with reference to the accompanying drawings.

Figure 3:
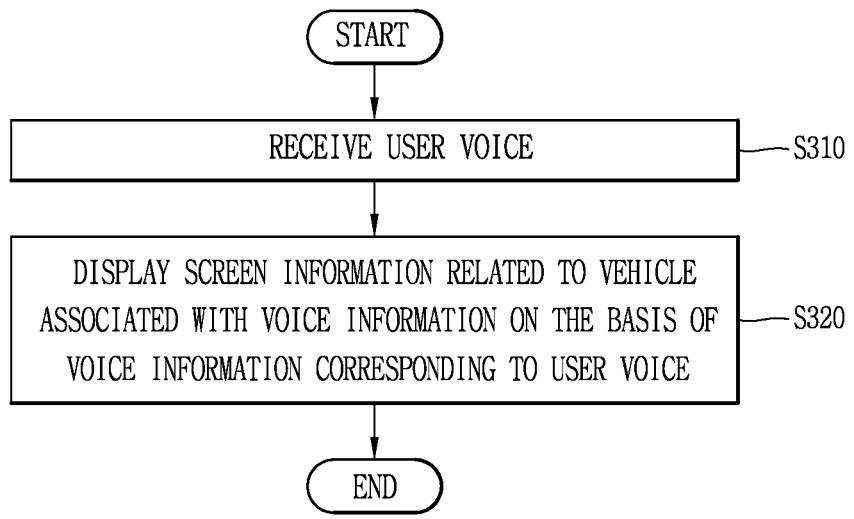
FIG. 3 is a flowchart illustrating a control method according to an embodiment of the present invention.
Figure 4:
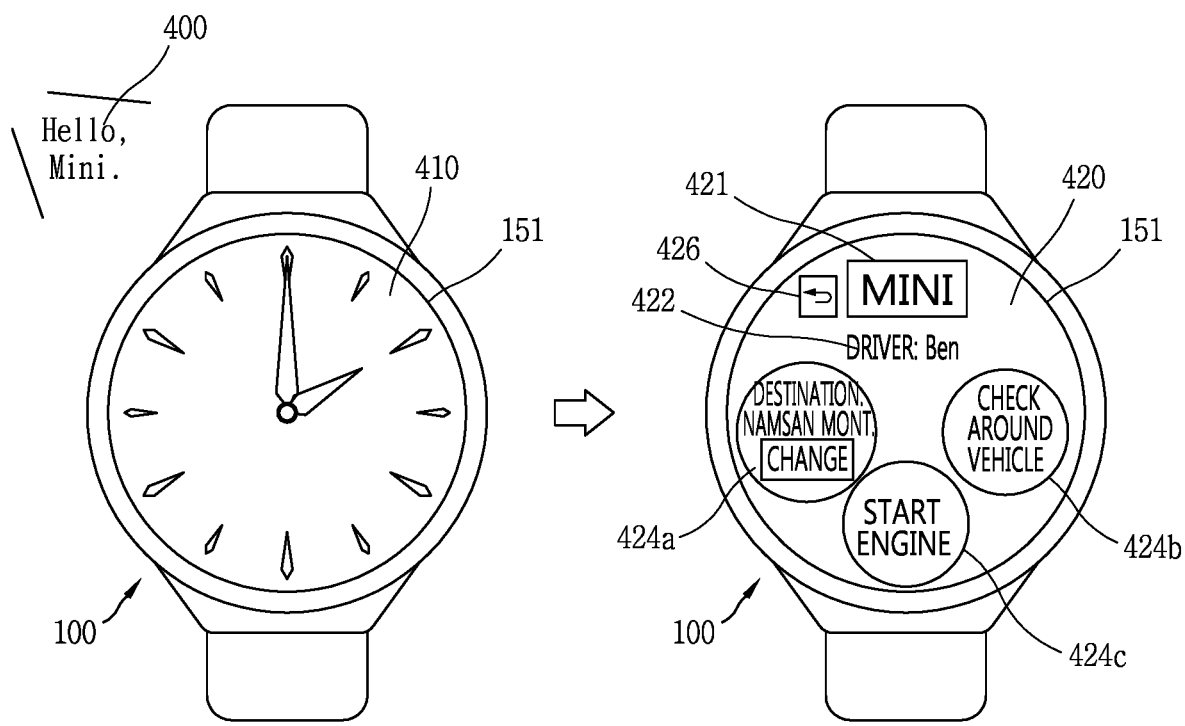
FIG. 4 is a conceptual diagram for describing the control method of FIG. 3.

FIG. 3 is a flowchart typically showing a control method according to an embodiment of the present invention, and FIG. 4 is a conceptual diagram illustrating the control method shown in FIG. 3.

Referring to FIG. 3, in the present invention, a step of receiving a user voice is performed (S310). In particular, the mobile terminal associated with the present invention may include an input unit 120 for receiving a user voice. The input unit 120 may be a microphone 122 described with reference to FIG. 1A. Hereinafter, reference numeral 122 is used for the input unit 120.

The control unit 180 may activate the input unit 122 on the basis of the user input of a predetermined method. For example, the control unit 180 may activate the input unit 122 on the basis that a touch (or push) is applied to the user input unit 323 shown in FIG. 2, a touch (e.g., a short touch, a long touch, etc.) associated with the activation function of the input unit 122 is applied to the display unit 151, a touch is applied to the icon associated with the activation function of the input unit 122, or the mobile terminal is moved with predetermined movement.

The control unit 180 may receive the user voice through the input unit 122 while the input unit 122 is activated. The control unit 180 may recognize (extract, determine, and decide) the voice information corresponding to the received voice when the user voice is received.

Specifically, when the input unit 122 is activated, the control unit 180 may determine whether the sound is a user voice when a sound of a predetermined size (volume) is received. Whether or not the sound is the user voice may be judged on the basis of the characteristics of the sound (e.g., the amplitude, frequency, waveform shape, waveform feature, etc. of a wave forming the sound) and since the contents related to this are general technology, so detailed description is omitted.

If it is determined that the sound is a user voice, the control unit 180 may recognize (extract, determine, and decide) the voice information corresponding to the user voice.

Specifically, the control unit 180 may recognize (extract, determine, and decide) the voice information corresponding to the user voice on the basis of the characteristics of the user voice (e.g., the amplitude, frequency, waveform shape, waveform feature, etc. of a wave forming the voice). Here, the voice information may include various types of information, for example, a word (keyword), a sentence or a specific sound that the user speaks. The technology for recognizing the user voice as the voice information may be a SPEECH TO TEXT (STT) technology, a speech recognition or voice recognition technology, and since the contents related to this correspond to a general technology, a detailed description thereof will be omitted.

Then, in the present invention, the step of displaying on the display unit the vehicle-related screen information associated with the voice information is performed (S320) on the basis of the voice information corresponding to the user voice.

Screen information related to a plurality of vehicles may be stored in advance in the memory 170 (see FIG. 1A) of the mobile terminal related to the present invention, and voice information (e.g., keyword) may be associated with each screen information related to the plurality of vehicles.

When the user voice is received, the control unit 180 recognizes the voice information corresponding to the user voice and extracts vehicle-related screen information associated with the recognized voice information. Thereafter, the control unit 180 may output the screen information related to the extracted vehicle to the display unit 151.

For example, as shown in FIG. 4, the watch type mobile terminal 100 related to the present invention may output time-related screen information 410 to the display unit 151. However, the display unit 151 may output various screen information that may be output from the mobile terminal 100, in addition to the time-related screen information 410.

As described above, the control unit 180 may activate the input unit 122 on the basis of the user input of a predetermined method. In addition, the control unit 180 may maintain the input unit 122 to be active whenever the mobile terminal 100 is on.

When the user voice 400 is received while the input unit 122 is activated, the control unit 180 may recognize the voice information (e.g., Hello mini) corresponding to the user voice 400.

The voice information may include at least one word (or vocabulary, phoneme, syllable, etc.). The control unit 180 may extract the words by parsing the voice information.

The control unit 180 may determine whether or not a keyword exists in the extracted words. The keyword may refer to a word associated with vehicle-related screen information.

The control unit 180 may output the screen information associated with the keyword to the display unit 151 when it is determined that the keyword exists in the extracted words. For example, when "mini" in the voice information "Hello mini" corresponds to the keyword, the control unit 180 may output the vehicle-related screen information 420 associated with the keyword "mini" to the display unit 151, as shown in the second drawing of FIG. 4.

That is, outputting the vehicle-related screen information associated with the voice information may include outputting vehicle-related screen information associated with the keyword included in the voice information.

As shown in the first and second drawings of FIG. 4, on the basis of the voice information corresponding to the user voice, the control unit 180 may output the vehicle-related screen information 420 associated with the voice information on the display unit 151 instead of the screen information 410 (e.g., time-related screen information) output in advance on the display unit 151. In this case, the previously output screen information 410 may not be output to the display unit 151.

Although not shown in the drawing, in order to allow both the previously output screen information 410 and the vehicle-related screen information 420 to be identified, the control unit 180 may control the transparency of at least one of the previously-output screen information 410 and the vehicle-related screen information 420.

The vehicle-related screen information 420 may include various types of information. For example, the vehicle-related screen information 420 includes information 421 on a vehicle to be a control target, user information 422, at least one graphical object 424a, 424b, and 424c associated with vehicle-related functions, and a button 426 for returning to screen information (e.g., time-related screen information), which is being output before the vehicle-related screen information is output. In addition, the vehicle-related screen information 420 may include various types of icons associated with functions for controlling the vehicle or various types of icons for controlling the mobile terminal 100.

The vehicle information 421 to be a control target means information corresponding to a vehicle to be controlled using the mobile terminal 100. The vehicle information 421 may be a vehicle name, a vehicle number, a vehicle image, etc., and may be previously set in the vehicle-related screen information 420, or may be set (or changed) by a user's setting.

The user information 422 may be determined on the basis of user authentication with the user voice received through the input unit 122. Specifically, the control unit 180 may perform user authentication with a user voice. User authentication performed using user voice may be referred to as voice authentication, voice ID method, or the like.

The control unit 180 may perform user authentication on the basis of a user voice characteristic (e.g., a characteristic of a wave (sound wave) forming a user voice).

The voice characteristic is different for each individual like fingerprint or iris, and it is impossible to modulate the voice due to the relative invariance of voice. When the voice heard by the ear changes while in cold or exited, the voice characteristic itself is relatively unchanged.

The control unit 180 may analyze the user voice received through the input unit 122, extract the user voice characteristic, and perform user authentication by comparing the extracted characteristic with the pre-stored characteristic. The method of performing the user authentication with the user voice corresponds to a general technique, and therefore, a detailed description thereof will be omitted.

At least one graphical object 424a, 424b, 424c associated with vehicle-related functions may be associated with functions for controlling the vehicle. If any one of the at least one graphical object is selected, in order to perform a function associated with the selected graphical object in the vehicle, the control unit 180 may transmit a control signal corresponding to the associated function to the vehicle. The control signal may be transmitted to the vehicle through the communication unit 110 (see FIG. 1A).

For example, if any one of a plurality of graphical objects 424a, 424b, and 424c is selected, when the function associated with the selected graphical object is a function for starting the vehicle, in order to start the vehicle, the control unit 180 may transmit a control signal associated with the function for starting the vehicle to the vehicle through the communication unit 110. The telematics terminal provided in the vehicle may start the vehicle on the basis of receiving the control signal associated with the function for starting the vehicle from the mobile terminal 100.

On the other hand, the vehicle-related functions may be performed on the basis of various conditions. Here, the fact that the vehicle-related function is performed means that the control signal associated with the function is transmitted to the vehicle in order to perform the vehicle-related function in the vehicle.

The various conditions refer to an assumption condition for performing a vehicle-related function, and for example, user authentication may be used. Here, the user authentication may be performed, for example, on the basis of voice recognition using a user voice, fingerprint recognition using a user's fingerprint, iris recognition using a user's iris, Personal Identification Number (PIN), password, or predefined user input pattern.

The control unit 180 may control the vehicle-related function so that different types of user authentication may be performed for each vehicle-related function. Specifically, the vehicle-related functions may be performed on the basis of user authentication performed in a different manner. Here, the fact that user authentication is performed in different ways may mean that user authentication is performed such that at least one of the types of user authentication (e.g., speech recognition, fingerprint recognition, etc.) and the number of user authentications is different from each other.

For example, when a first type of user authentication (e.g., speech recognition) is performed, the control unit 180 may perform a first function related to a vehicle. Also, when a second type of user authentication (e.g., fingerprint recognition) different from the first type is performed, the control unit 180 may perform a second vehicle-related function different from the first vehicle-related function.

As another example, the control unit 180 may perform a vehicle-related function on the basis of the number of user authentications. In one example, the first vehicle-related function may be performed on the basis that the graphical object related to the first function is selected (or touched) without user authentication.

In addition, only when a graphical object associated with the second function is first selected (touched) after the mobile terminal is mounted (worn) on a part of the user's body, the second vehicle-related function different from the first function may be performed on the basis of user authentication. Thereafter, when the graphical object associated with the second function is selected (touched) again after the user authentication is performed while the mounting of the mobile terminal is maintained, the second function may be performed without user authentication.

Here, if the mobile terminal is released from the user's body part and then worn again, only when the graphical object related to the second function is selected for the first time after being worn again, the second function may be performed on the basis of user authentication.

In addition, each time a graphical object associated with a third function is selected (touched), the third vehicle-related function different from the second function may be performed on the basis of user authentication.

Performing the user authentication on the basis of assumption may include meaning that it is performed on the basis of the success of the user authentication.

As described above, the present invention may set the number of user authentications differently for each vehicle-related function. Differently setting the number of user authentications for each vehicle-related function may mean differently setting a user authentication level (grade) for each function.

For example, the first vehicle-related function is a function corresponding to a first level (or a low case), and the second vehicle-related function corresponds to a second level (or middle case). In addition, the third vehicle-related function may be a function corresponding to a third level (high case) higher than the second level.

In other words, the function corresponding to the first level may mean a function that may be performed without user authentication. The function corresponding to the second level may be a function requiring only user authentication for the first time after the mobile terminal is mounted on a part of the user's body. In addition, the function corresponding to the third level may be a function requiring user authentication at each execution. That is, the high level in this specification may mean that the number of times (or security level) that the user authentication should be performed is large.

The first to third vehicle-related functions (functions corresponding to the first to third levels) described above may include various functions that may be performed in the vehicle, and may be preset by the user. It should be noted that the mobile terminal related to the present invention is not limited to the example described above.

On the other hand, the vehicle-related screen information may be screen information reflecting the functions most recently set by the user (or the driver) in the vehicle or the mobile terminal. For example, in relation to the control unit 180, if the most recently set destination in the vehicle or mobile terminal is "Namsan Mountain," as shown in the second drawing of FIG. 4, the graphical object 424a included in the vehicle-related screen information 420 may reflect a destination corresponding to the "Namsan Mountain." In addition, although not shown in the drawing, a radio frequency, a music type, whether to operate an air conditioner (heater), and a function (or setting, setting value) such as an air conditioner (heater) temperature, which are most recently set by a user, may be reflected on the vehicle-related screen information.

With such a configuration, the present invention may provide a user interface capable of controlling a vehicle using a mobile terminal. In addition, the present invention may improve security for vehicle control on the basis of performing different types of user authentication for each vehicle-related function.

Also, as the vehicle-related screen information reflecting the most recently set functions in the vehicle or the mobile terminal is output, the present invention may improve user convenience by providing UI/UX related to vehicle control optimized for a user.

Hereinafter, a method of controlling a vehicle using a mobile terminal related to the present invention and UI/UX related thereto will be described in more detail with reference to the accompanying drawings.

Figure 5A:
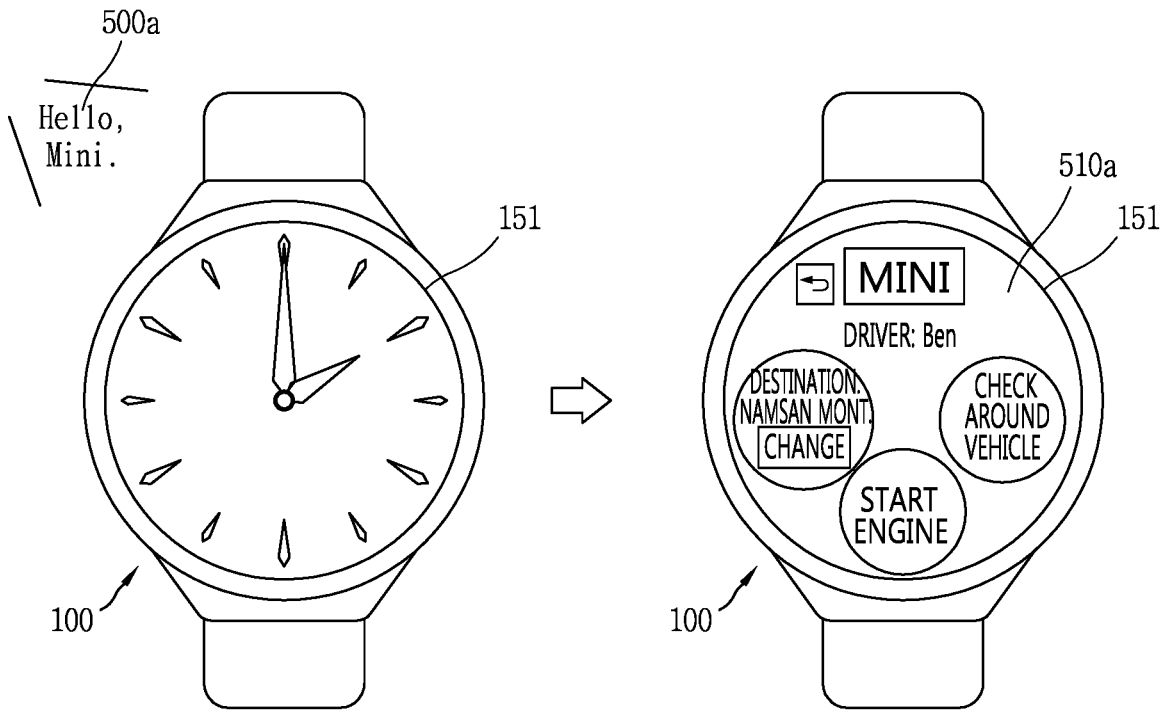
FIGS. 5A and 5B are conceptual diagrams illustrating a method of outputting different vehicle-related screen information for each keyword included in voice information corresponding to a user voice.
Figure 5B:
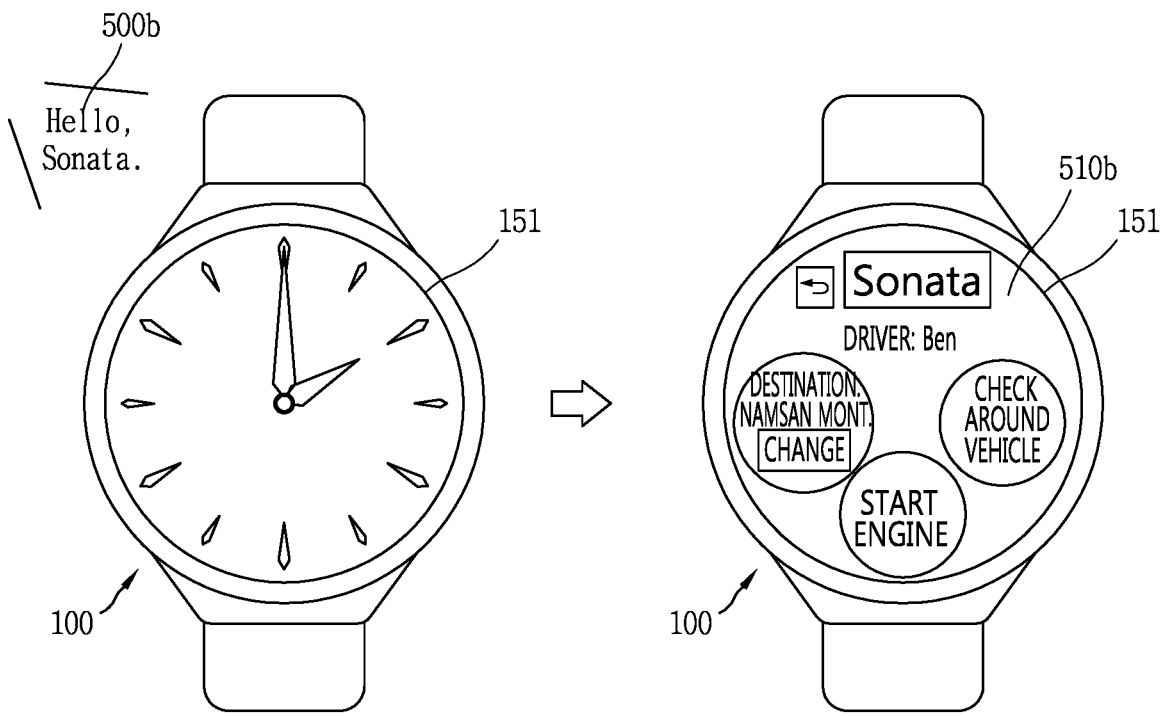

FIGS. 5A and 5B are conceptual diagrams illustrating a method of outputting different vehicle-related screen information for each keyword included in voice information corresponding to a user voice.

When the user voice is received through the input unit 122, the control unit 180 may recognize the voice information corresponding to the user voice. Also, the control unit 180 may output different vehicle-related screen information to the display unit 151 on the basis of the keyword included in the voice information. That is, different vehicle-related display information may be output to the display unit 151 on the basis of the keyword included in the voice information.

Specifically, when the first keyword is included in the voice information corresponding to the user voice, the control unit 180 may output the first vehicle-related screen information associated with the first keyword to the display unit 151. In addition, when a second keyword different from the first keyword is included in the voice information, the control unit 180 may output the second vehicle-related screen information associated with the second keyword to the display unit 151.

For example, as shown in the first drawing of FIG. 5A, when the first keyword (e.g., mini) is included in the voice information included in the user voice 500a, the control unit 180 may output the first vehicle-related screen information 510a associated with the first keyword to the display unit 151, as shown in the second drawing of FIG. 5A.

As another example, as shown in the first drawing of FIG. 5B, if the voice information included in the user voice 500b includes a second keyword (e.g., sonata) different from the first keyword, the control unit 180 may output the second vehicle-related screen information 510a associated with the second keyword to the display unit 151, as shown in the second drawing of FIG. 5B.

The first vehicle-related screen information may include a graphical object capable of controlling the first vehicle. Here, the graphical object capable of controlling the first vehicle may refer to a graphical object linked to functions executable by the first vehicle. The second vehicle-related screen information may also include a graphical object capable of controlling the second vehicle.

Through such a configuration, as different vehicle-related screen information is output on the basis of the keyword included in the voice information corresponding to the user voice, the present invention may provide UI/UX that allows a user to output screen information for controlling a desired vehicle.

Meanwhile, the control unit 180 of the mobile terminal related to the present invention may output vehicle-related screen information to the display unit 151 on the basis of user authentication. Hereinafter, the contents related to the above will be described in more detail with reference to FIGS. 6A and 6B.

Figure 6A:
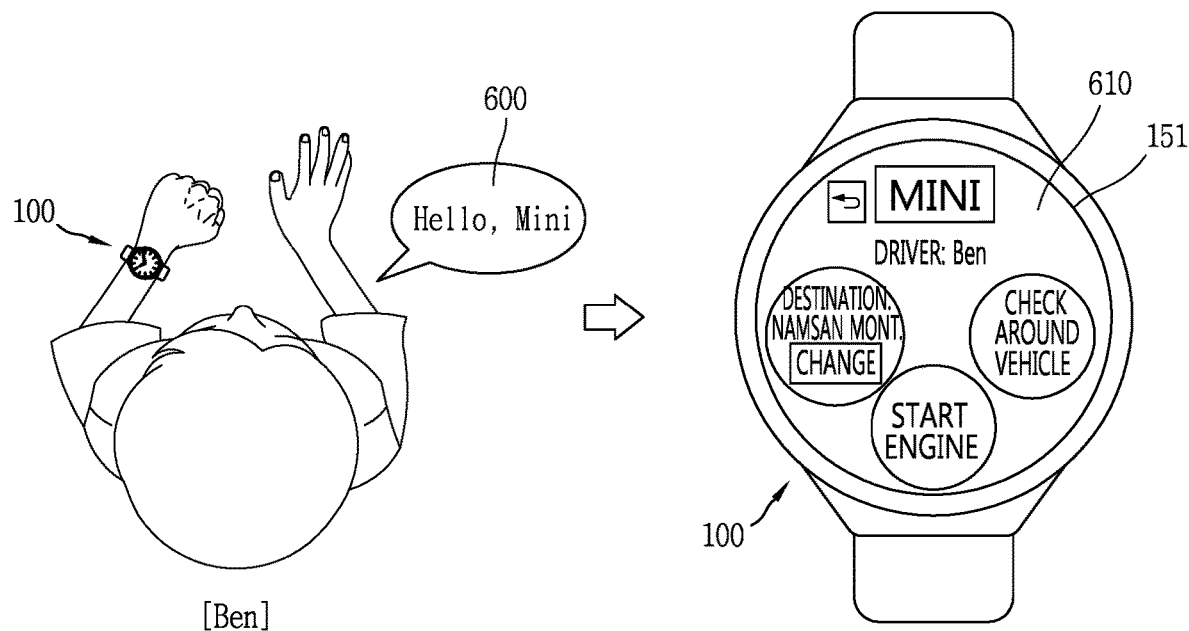
FIGS. 6A and 6B are conceptual diagrams illustrating a method of outputting vehicle-related screen information on the basis of user authentication with a user voice.
Figure 6B:
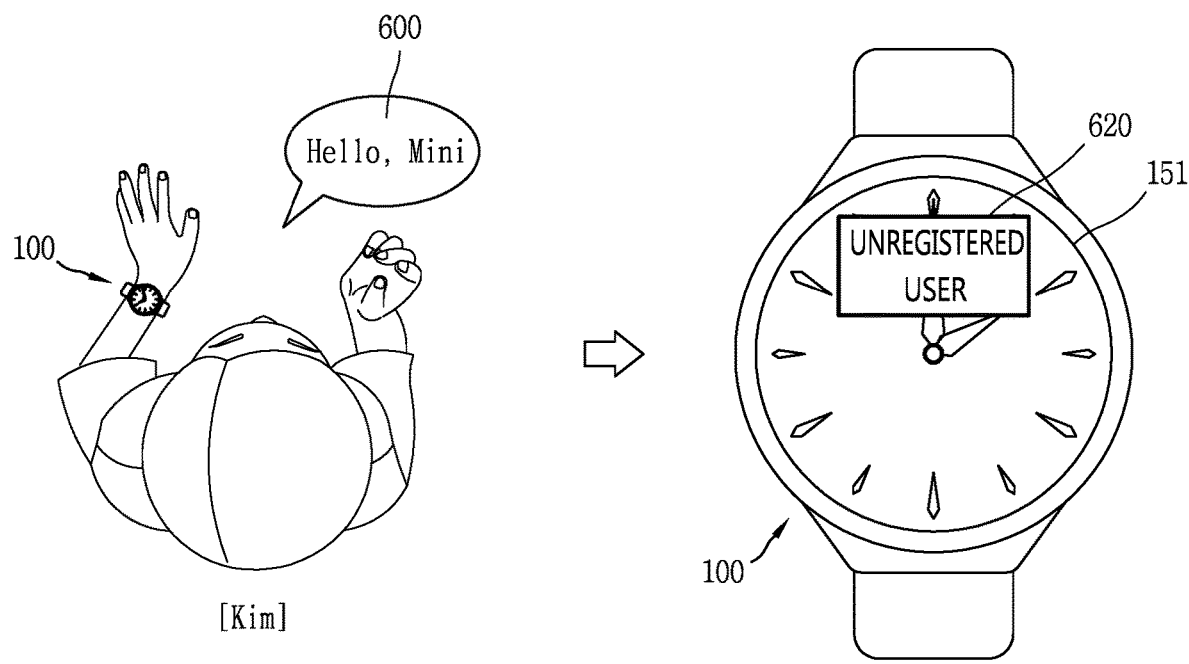

FIGS. 6A and 6B are conceptual diagrams illustrating a method of outputting vehicle-related screen information on the basis of user authentication with a user voice.

As described above, the mobile terminal related to the present invention may perform user authentication with a user voice. Specifically, when the user voice is received through the input unit 122, the control unit 180 may recognize the user by analyzing the user voice.

The control unit 180 may output the vehicle-related screen information to the display unit 151 on the basis that the user authentication with the user voice is performed (succeeded). That is, the vehicle-related screen information may be output on the basis that user authentication with a user voice is performed.

Specifically, even if the voice information corresponding to the user voice corresponds to the voice information associated with the specific vehicle-related screen information (or even if the voice information includes the keyword associated with the specific screen information), when the user authentication with the user voice fails (or is determined as an unregistered user), the control unit 180 may not output the vehicle-related screen information to the display unit 151.

For example, as shown in the first drawing of FIG. 6A, if the user who provides a user voice 600 is a pre-registered user (Ben), the control unit 180 may extract (identify, recognize, and determine) the user information using the user voice 600. If the extracted user information corresponds to the pre-registered user (Ben) (i.e., when the user authentication succeeds) as shown in the second drawing of FIG. 6A, on the basis of the voice information (e.g., the keyword mini) corresponding to the user voice 600, the control unit 180 may output the vehicle-related screen information 610 associated with the voice information to the display unit 151.

As another example, it is assumed that the user who provides the user voice 600 is a user who is not registered (Kim), as shown in the first drawing of FIG. 6B. In this case, the control unit 180 may extract (identify, recognize, and determine) the user information using the user voice 600. If it is determined that the user is not registered on the basis of the extracted user information, the control unit 180 may not output vehicle-related screen information, as shown in the second drawing of FIG. 6B. At this time, as shown in the second drawing of FIG. 6B, if user authentication fails, the control unit 180 may output to the display unit 151 the notification information 620 indicating that the user authentication fails.

Through such a configuration, the security related to vehicle control may be improved in the present invention.

Meanwhile, the mobile terminal related to the present invention may output different vehicle-related screen information on the basis of the user information identified by the user authentication. Hereinafter, a method of outputting different vehicle-related screen information on the basis of user information will be described in more detail with reference to FIGS. 7A and 7B.

Figure 7A:
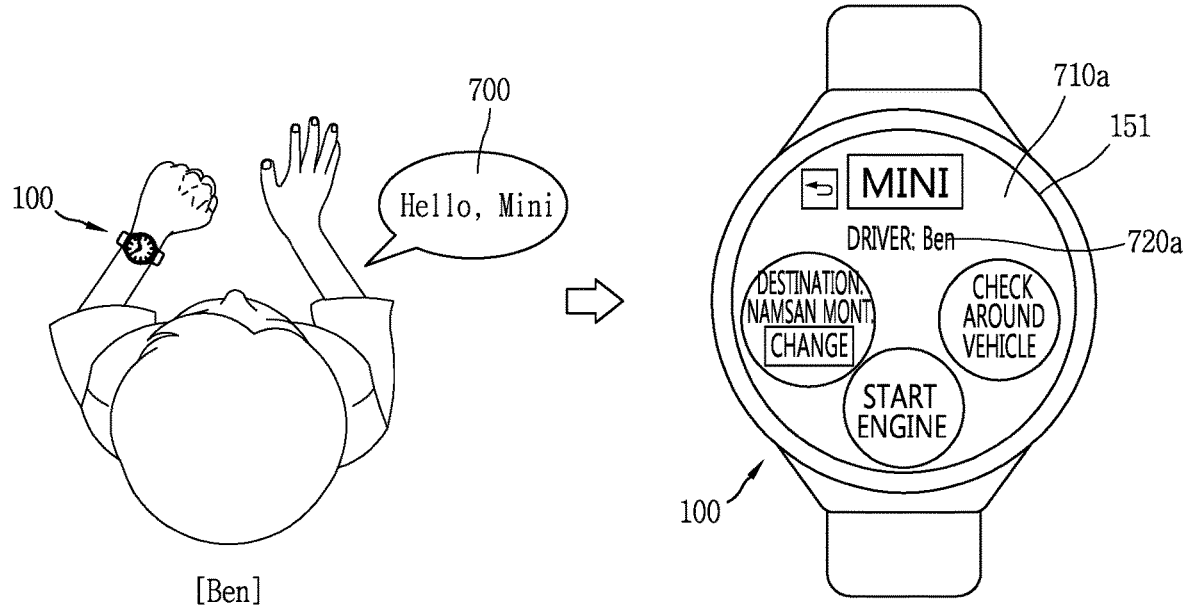
FIGS. 7A and 7B are conceptual diagrams illustrating a method of outputting different vehicle-related screen information on the basis of user information identified by user authentication.
Figure 7B:
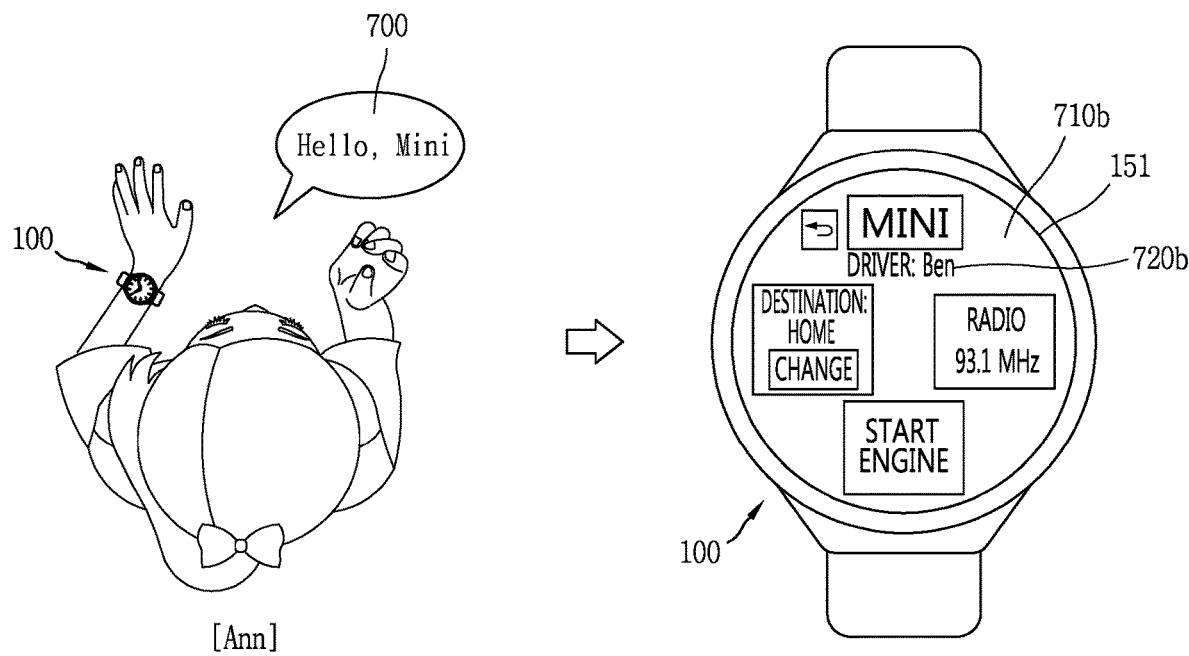

FIGS. 7A and 7B are conceptual diagrams illustrating a method of outputting different vehicle-related screen information on the basis of user information identified by user authentication.

When a user voice is received through the input unit 122, the control unit 180 may perform user authentication with the received user voice. Specifically, the control unit 180 may extract user information using the received user voice, and perform user authentication on the basis of whether the extracted user information corresponds to pre-registered user information.

In the mobile terminal related to the present invention, a plurality of user information may be pre-registered (stored). The control unit 180 may output different vehicle-related screen information on the basis of the user information identified by the user authentication. Here, the user information identified by the user authentication may refer to user information extracted on the basis of a user voice in a user authentication process.

Specifically, when the first user information is identified by the user authentication, the control unit 180 may output the first vehicle-related screen information to the display unit 151. In addition, when the second user information different from the first user information is identified by the user authentication, the control unit 180 may output the second vehicle-related screen information different from the first screen information to the display unit 151.

For example, as shown in the first drawing of FIG. 7A, if the user speaking the user voice 700 corresponds to the first user (Ben), the control unit 180 may extract first user information corresponding to the first user, and as shown in the second drawing of FIG. 7A, output the first vehicle-related screen information 710a to the display unit 151 on the basis of the extracted first user information and voice information corresponding to the user voice 700 (or keyword included in the voice information).

As another example, as shown in the first drawing of FIG. 7B, if the user speaking the user voice 700 corresponds to the second user (Ann), the control unit 180 may extract second user information corresponding to the second user, and as shown in the second drawing of FIG. 7B, output the second vehicle-related screen information 710b to the display unit 151 on the basis of the extracted second user information and voice information corresponding to the user voice 700.

That is, even if the voice information corresponding to the user voice (or keyword included in the voice information) is the same on the display unit 151, different display information (first and second vehicle-related screen information) may be output. If the voice information corresponding to the user voice is the same, the first vehicle-related screen information 710a and the second vehicle-related screen information 710b may be screen information for controlling the same vehicle.

For example, the first vehicle-related screen information 710a is screen information previously set by the first user, and the second vehicle-related screen information 710b is screen information previously set by the second user.

As another example, the first vehicle-related screen information 710a is screen information reflecting the functions most recently (later) set by the first user in the vehicle or the mobile terminal, and the second vehicle-related screen information 710b may be screen information reflecting the functions most recently set by the second user in the vehicle or the mobile terminal.

According to the present invention, by providing vehicle-related screen information optimized for each user, it is possible to provide a UI/UX in which a plurality of users may control a specific vehicle in an optimized manner using one mobile terminal.

The embodiments described above with reference to FIGS. 5A to 7B are not limited to the respective independent embodiments, but may be implemented through at least two combinations.

Hereinafter, a method of controlling a vehicle using vehicle-related screen information output to a mobile terminal related to the present invention will be described in more detail with reference to the attached drawing.

Figure 8:
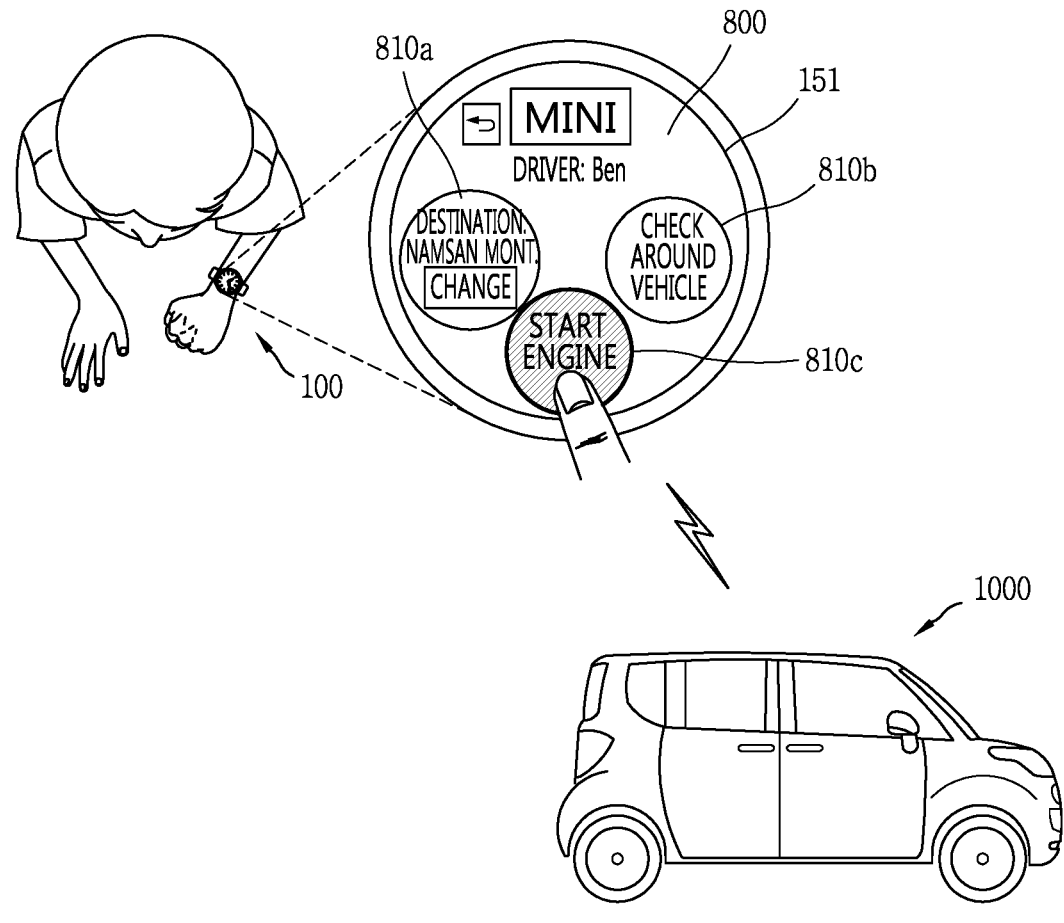
FIG. 8 is a conceptual diagram for describing a method of controlling a vehicle using screen information related to a vehicle.
Figure 8:
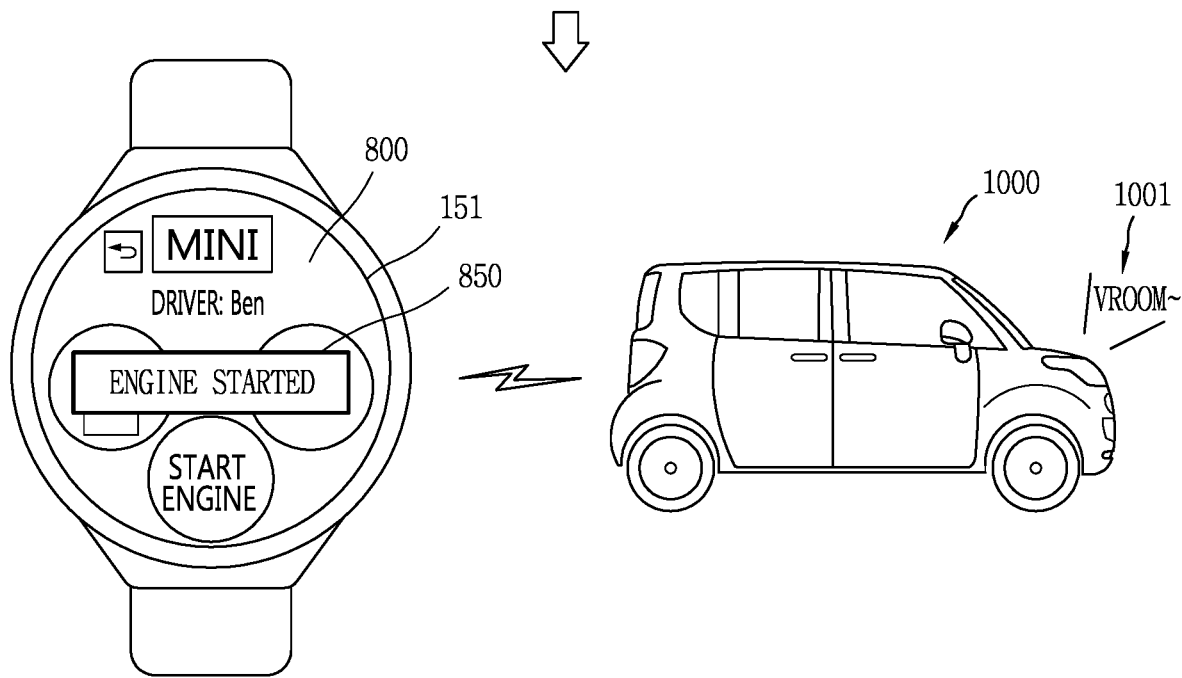

FIG. 8 is a conceptual diagram for describing a method of controlling a vehicle using vehicle-related screen information, and FIGS. 9A, 9B, 9C, and 9D are conceptual diagrams illustrating a method of performing a vehicle-related function on the basis of user authentication with a user voice.

As described above, the control unit 180 of the mobile terminal related to the present invention may output vehicle-related screen information associated with voice information to the display unit 151 on the basis of the voice information corresponding to the user voice when the user voice is received.

As shown in the first drawing of FIG. 8, the vehicle-related screen information 800 may include a plurality of graphical objects 810a, 810b, and 810c associated with a plurality of functions related to a vehicle, respectively. However, only a single graphical object may be output to the vehicle-related screen information 800.

For example, the first graphical object 810a may be associated with a first vehicle-related function, and the second graphical object 810b may be associated with a second vehicle-related function. Also, the third graphical object 810c may be associated with a third vehicle-related function. The number of the graphical objects and functions associated with the graphical objects may be set and changed by the user.

When any one of a plurality of graphical objects is selected (touched), in order to allow a function associated with the selected graphical object to be performed in the vehicle, the control unit 180 may transmit a control signal corresponding to the associated function to the vehicle through the communication unit 110 (see FIG. 1A).

The selection of the graphical object may be performed in various ways such as a user voice, a predetermined movement of a mobile terminal, and selection by an external terminal in addition to a touch.

For example, as shown in the first drawing of FIG. 8, when one of the plurality of graphical objects 810a, 810b, and 810c included in the vehicle-related screen information 800 is selected (e.g., 810c) and when the function associated with any one of the graphical objects 810c is a function for starting the vehicle, the control unit 180 may transmit a control signal corresponding to the function for starting the vehicle to the vehicle through the communication unit 110.

Thereafter, the vehicle 1000 (or the telematics terminal provided in the vehicle) may perform a function corresponding to the control signal on the basis of the control signal transmitted from the mobile terminal. For example, the vehicle 1000 may start (1001) the vehicle on the basis of receiving a control signal corresponding to the function for starting the vehicle, as shown in the second drawing of FIG. 8.

Then, the vehicle 1000 may transmit, to the mobile terminal 100, a signal indicating that the function corresponding to the control signal has been performed in the vehicle. As shown in the second drawing of FIG. 8, the control unit 180 outputs, on the basis of the received signal, notification information 850 making a notification that the function associated with any one of the graphical objects has been performed in the vehicle.

The notification information 850 may be implemented in various forms, for example, in the form of text, voice, vibration, and the like.

On the other hand, as described above, at least some of the vehicle-related functions may be performed on the basis of the user authentication being performed. For example, a control signal corresponding to at least one function of a plurality of functions related to a vehicle may be transmitted on the basis of user authentication performed using a user voice.

For example, a control signal corresponding to a first function among the plurality of functions may be transmitted without user authentication, and a control signal corresponding to a second function different from the first function among the plurality of functions may be transmitted on the basis of user authentication only when the graphical object associated with the second function is selected first after the main body is worn on the wrist. In addition, each time a graphical object associated with the third function among the plurality of graphical objects is selected, a control signal corresponding to a third function different from the first and second functions among the plurality of functions may be transmitted on the basis of user authentication being performed.

Here, when the second function is described in more detail, when a graphical object associated with the second function is first selected after the main body of the mobile terminal is worn on a part of the user's body (e.g., a wrist), on the basis of the user authentication performed using the user voice, the control unit 180 may transmit a control signal corresponding to the second function to the vehicle.

Thereafter, in a state where the wear is maintained, if a graphical object associated with the second function is selected again after a control signal corresponding to the second function is transmitted, the control unit 180 may transmit the control signal corresponding to the second function to the vehicle without the user authentication.

As described above, the first to third functions may include a vehicle-related function, that is, various functions that may be performed in the vehicle. In addition, the first function may be at least one function corresponding to a low case, and the second function may be at least one function corresponding to a second level higher than the first level, and the third function may be at least one function corresponding to a third level higher than the second level.

Hereinafter, as shown in the first drawing of FIG. 9A, it is assumed that the first graphical object 910a is associated with a first vehicle-related function, and the second graphical object 910b is associated with a second vehicle-related function, and the third graphical object 910c is associated with a third vehicle-related function.

In addition, it is described exemplarily that the first vehicle-related function is a function for setting a destination of a navigation module included in a telematics terminal provided in a vehicle, and the second vehicle-related function is a function for activating a camera included in the telematics terminal provided in the vehicle and transmitting an image received through the camera to the mobile terminal, and a third vehicle-related function is a function for starting the vehicle.

Hereinafter, the contents described above will be described with reference to FIGS. 9A to 9D.

Figure 9A:
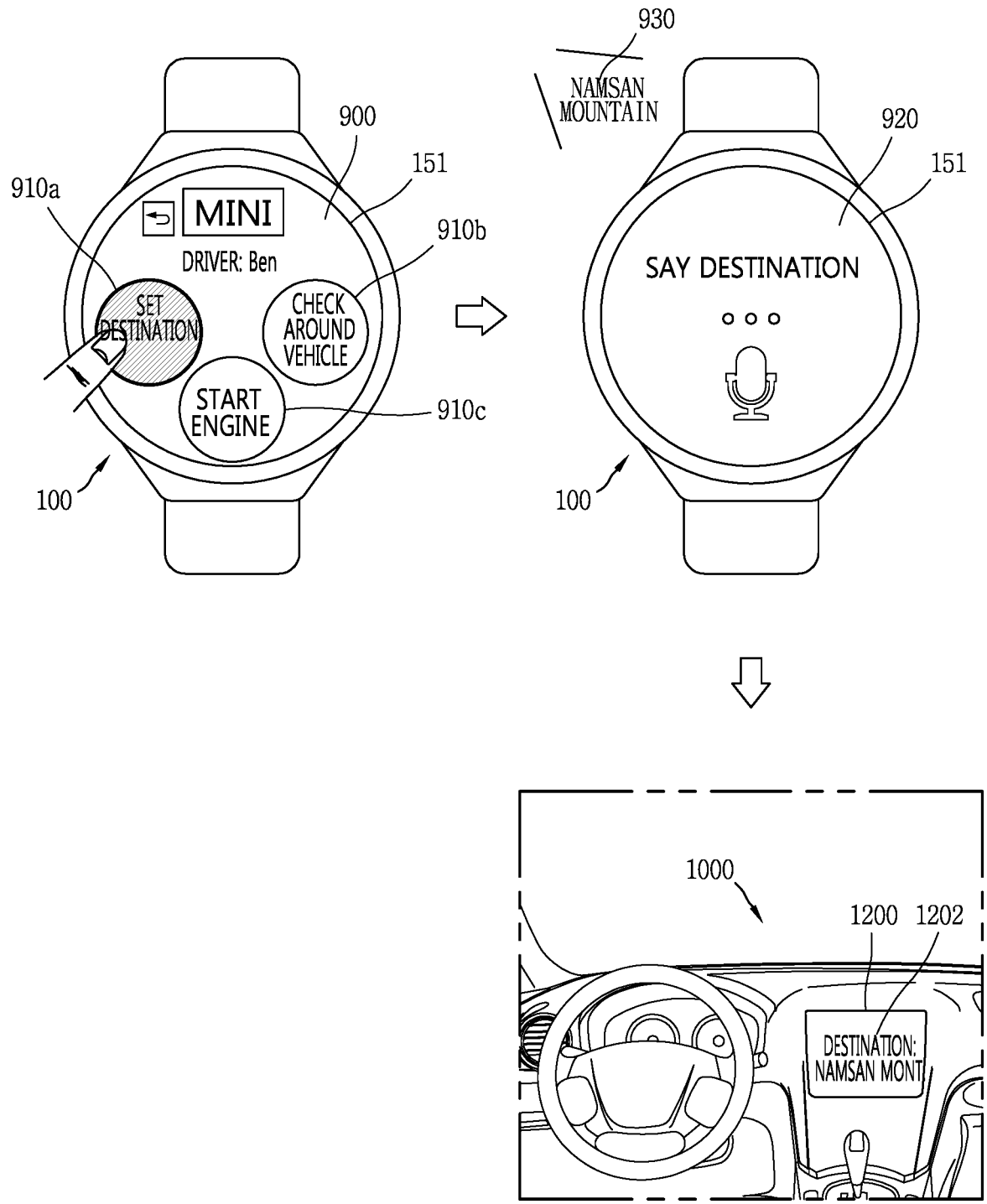
FIGS. 9A, 9B, 9C, and 9D are conceptual diagrams illustrating a method of performing a vehicle-related function on the basis of user authentication with a user voice.

Referring to FIG. 9A, vehicle-related screen information 900 may be output to the display unit 151. In a state where the vehicle-related screen information 900 is output to the display unit 151, if the first graphical object 910a included in the vehicle-related screen information 900 is selected, the control unit 180 may output the vehicle-related screen information 900 and other screen information 920 to the display unit 151. If the function associated with the first graphical object 910a is a function for setting a destination of a navigation module included in the telematics terminal provided in the vehicle, the other screen information 920 may be screen information for guiding destination setting.

For example, as shown in the second drawing of FIG. 9A, the control unit 180 may set a destination using a user voice. For this, the control unit 180 may output the screen information 920 for guiding the user to speak the user voice corresponding to the destination to the display unit 151 when the first graphical object 910a is selected.

Moreover, although not shown in the drawing, if the first graphical object 910a is selected, the control unit 180 may display a keypad for inputting destination information or a previously stored destination list on the display unit 151.

When a user voice 930 is received through the input unit in a state where the screen information 920 is output, the control unit 180 may recognize the voice information (e.g., Namsan Mountain) corresponding to the user voice 930. Then, the control unit 180 may transmit, to the vehicle 1000, a control signal for controlling the destination corresponding to the recognized voice information to be set in the navigation module provided in the vehicle.

As shown in the third drawing of FIG. 9A, on the basis of the control signal being received, a destination 1202 corresponding to the recognized voice information may be set in the navigation module 1200 of the vehicle 1000.

At this time, even if user authentication is not performed, the control unit 180 may transmit, to the vehicle 1000, a control signal for allowing the destination to be set in a navigation module provided in the vehicle.

Figure 9B:
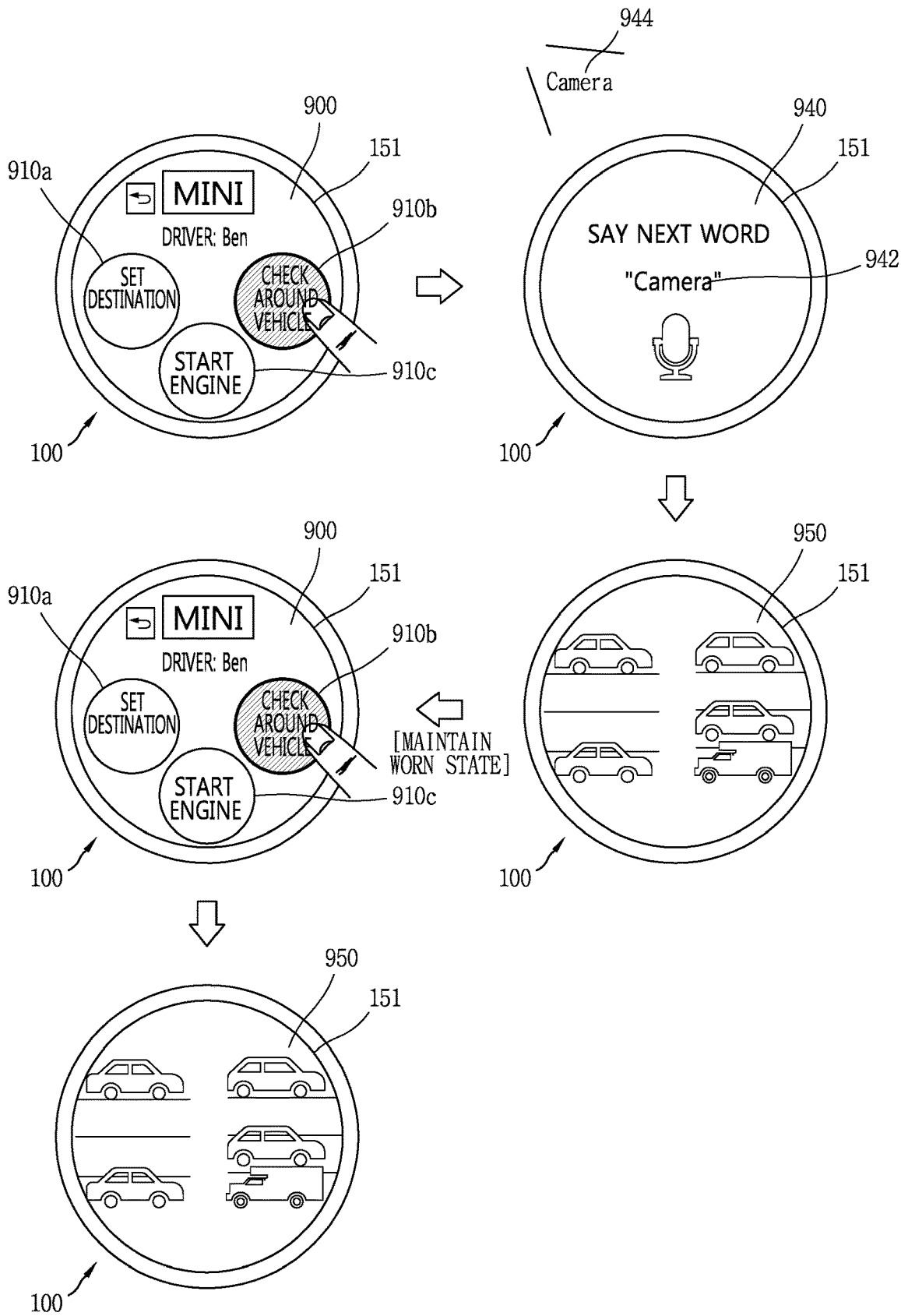

On the other hand, as shown in the first drawing of FIG. 9B, after the mobile terminal is worn on a part of the user's body (e.g., the wrist), if the second graphical object 910b included in the vehicle-related screen information 900 is selected for the first time, the control unit 180 may output the screen information 940 for guiding the user authentication to the display unit 151 as shown in the second drawing of FIG. 9B.

The screen information 940 for guiding to perform the user authentication may include word information 942 for guiding a user voice used for user authentication. In a state where the screen information 940 guiding to perform the user authentication is displayed, when a user voice 944 is received through the input unit, the control unit 180 may perform user authentication on the basis of the received user voice 944.

As described above, the control unit 180 may analyze the characteristics of the received user voice 944 to extract user voice characteristics, and on the basis that the user voice characteristic matches the pre-registered user voice characteristic, perform user authentication.

At this time, as shown in the second drawing of FIG. 9B, the control unit 180 may improve the accuracy and promptness of the user authentication with the user voice by using the user voice corresponding to the word information 942. Specifically, the control unit 180 sets a user voice characteristic corresponding to the word information in advance, and if the user authentication of the user voice received through the input unit is performed, the control unit 180 may transmit, to the vehicle 1000, a control signal corresponding to the function associated with the second graphical object 910b (e.g., a function for activating a camera included in a telematics terminal provided in a vehicle and transmitting an image received through the camera to a mobile terminal).

Thereafter, on the basis of the control signal, the vehicle 1000 may activate a camera provided in the vehicle and transmit the image received through the activated camera to the mobile terminal.

Thereafter, as shown in the third drawing of FIG. 9B, an image 950 transmitted from the vehicle 1000 may be output to the display unit 151 of the mobile terminal 100 according to the present invention.

Thereafter, in a state where the wearing of the main body of the mobile terminal related to the present invention is maintained, as shown in the fourth drawing of FIG. 9B, if the second graphical object 910b is selected again, the control unit 180 may transmit a control signal corresponding to the function associated with the second graphical object 910b to the vehicle 1000 without additional user authentication. Thereafter, as shown in the fifth drawing of FIG. 9B, the control unit 180 may output the screen information related to the function associated with the second graphical object (the image 950 transmitted from the vehicle 1000) to the display unit 151.

Figure 9C:
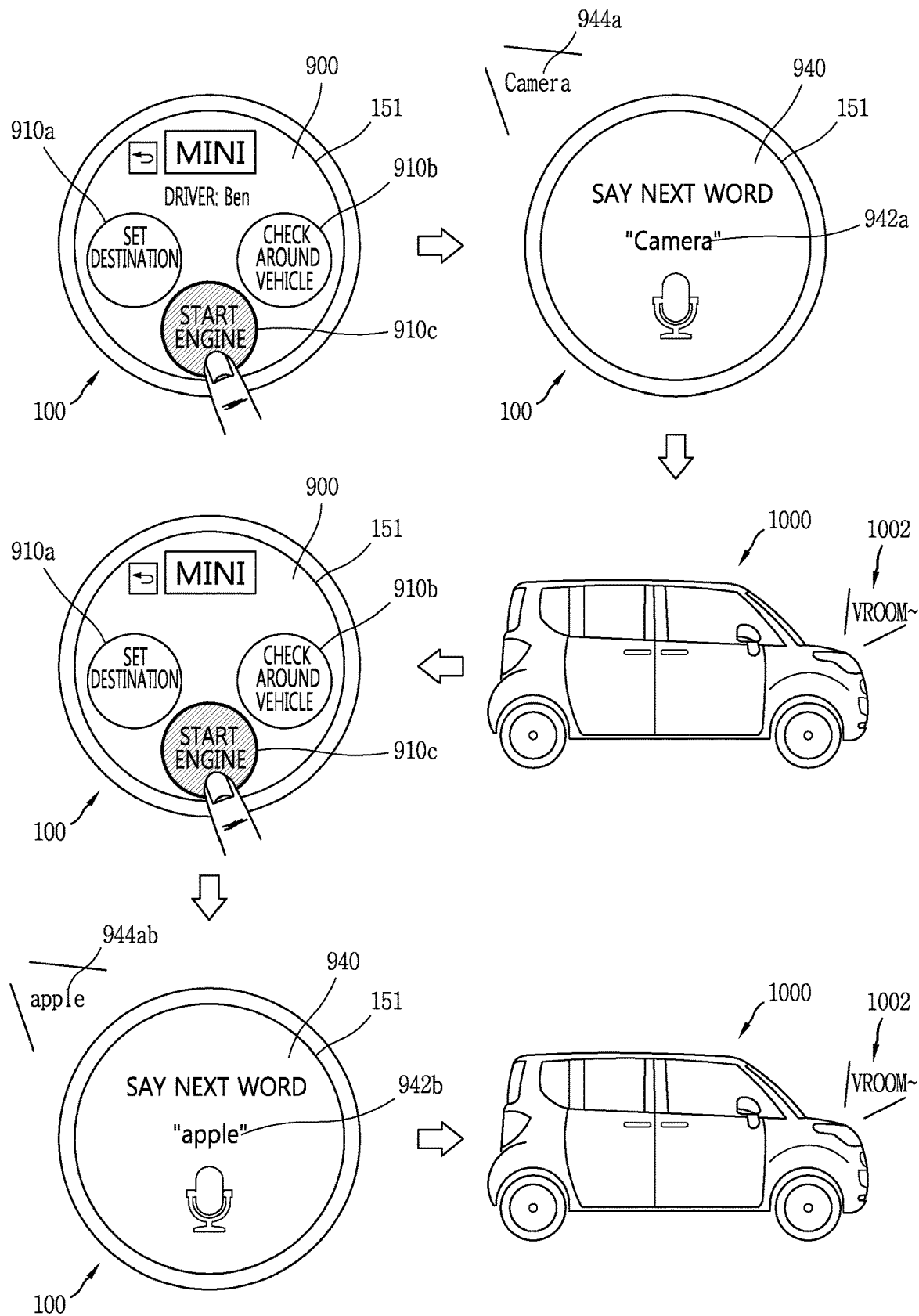

On the other hand, as shown in the first drawing of FIG. 9C, if the third graphical object 910c included in the vehicle-related screen information 900 is selected, the control unit 180 may output the screen information 940 for guiding to perform user authentication to the display unit 151 as shown in the second drawing of FIG. 9C.

The screen information 940 for guiding to perform the user authentication may include word information 942a for guiding a user voice used for user authentication. In a state where the screen information 940 guiding to perform the user authentication is displayed, when a user voice 944a is received through the input unit, the control unit 180 may perform user authentication on the basis of the received user voice 944a.

If the user authentication is performed (successful), the control unit 180 may transmit a control signal corresponding to the function associated with the third graphical object (e.g., a function for starting the vehicle) to the vehicle 1000.

The vehicle 1000 may start (1002) the vehicle on the basis of receiving the control signal, as shown in the third drawing in FIG. 9C.

Thereafter, when the third graphical object 910c is selected again, even if the main body of the mobile terminal is maintained worn on the user's body part (e.g., the wrist), the control unit 180 may output the screen information 940 for guiding to perform user authentication again as shown in the fourth drawing of FIG. 9C.

Thereafter, when a user voice 944ab is received through the input unit, the control unit 180 may perform user authentication on the basis of the user voice 944ab, and if the user authentication is successful, transmit a control signal corresponding to a function associated with the third graphical object (e.g., a function for starting the vehicle) to the vehicle 1000.

The vehicle 1000 may start (1002) the vehicle on the basis of receiving the control signal, as shown in the sixth drawing in FIG. 9C.

On the other hand, when user authentication with user voice fails, the control unit 180 of the mobile terminal related to the present invention may output, to the display unit 151, the screen information that may perform user authentication by using another method instead of using the user voice.

Figure 9D:
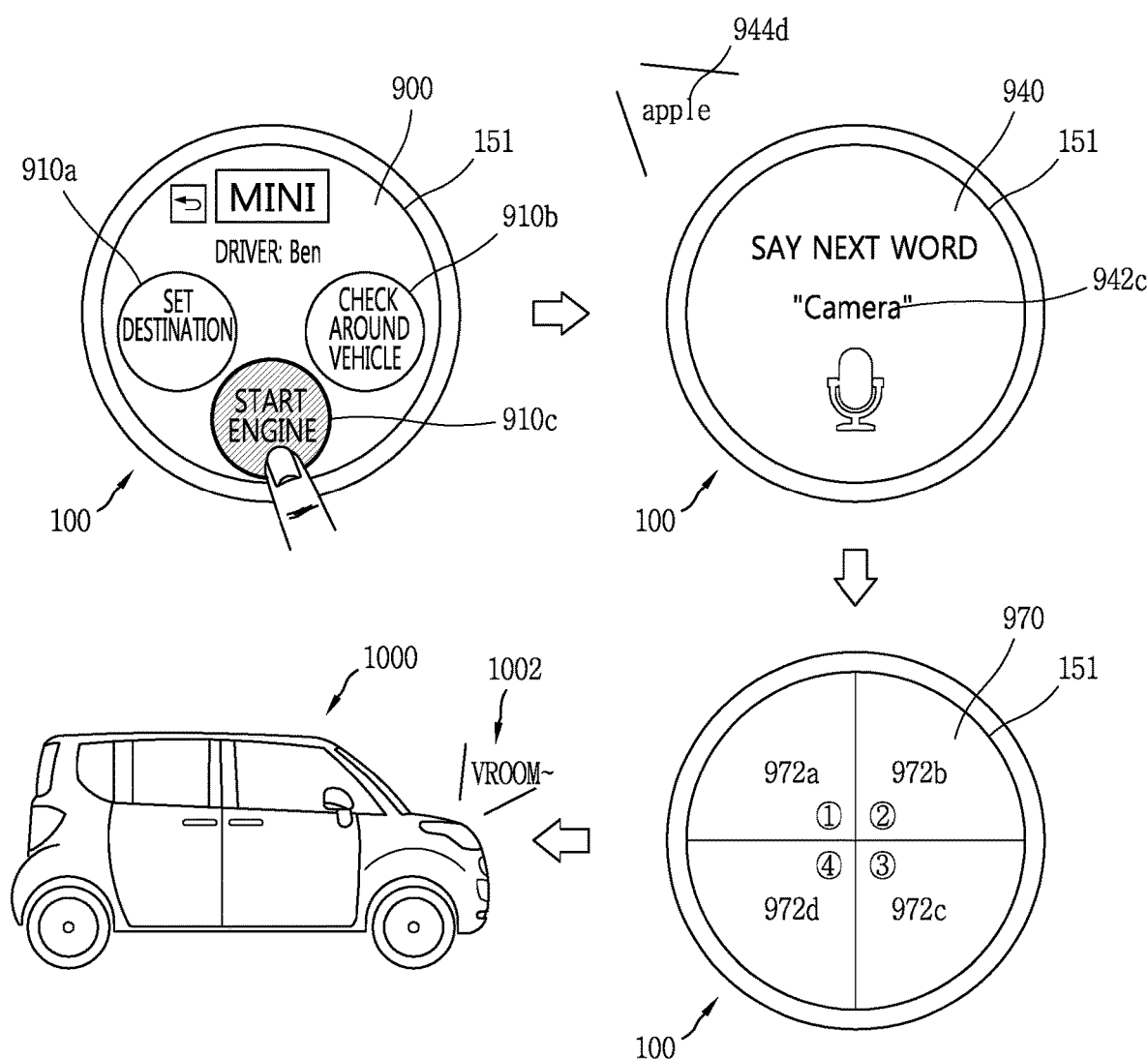

For example, as shown in the first drawing of FIG. 9D, after the graphical object 910c associated with the function on the basis of user authentication is selected, if the user voice 944d is received as shown in the second drawing of FIG. 9D, user authentication may be performed using the received user voice. In this case, if the user authentication fails, the control unit 180 may output, to the display unit 151, the screen information 970 that may perform user authentication with a method other than the method using the user voice, as shown in the third drawing of FIG. 9D.

The screen information 970 may be, for example, screen information capable of performing user authentication with a user input pattern.

The screen information 970 may be divided into a plurality of areas 972a, 972b, 972c, and 972d. The control unit 180 may receive at least one touch input in a state where the screen information 970 is output. When the at least one touch input is received, the control unit 180 determines an area to which the at least one touch input is applied, and performs user authentication on the basis of the area to which the touch input is applied.

For example, as shown in the third drawing of FIG. 9D, when the user input pattern previously stored in the mobile terminal is a pattern sequentially input to the first area 972a, the second area 972b, the third area 972c, and the fourth area 972d, on the basis that a plurality of touch inputs are sequentially input to the first area 972a, the second area 972b, the third area 972c and the fourth area 972d according to the passage of time, the control unit 180 may determine that the user authentication is successful.

If the user authentication is successful, the control unit 180 may transmit a control signal corresponding to the function associated with the selected graphical object 910c to the vehicle 1000.

The vehicle 1000 may perform a function 1002 associated with the graphical object 910c on the basis of the received control signal.

The contents described with reference to FIG. 9D may be identically/similarly inferred and applied to all cases (e.g., FIGS. 6A and 6B) that user authentication is performed.

Meanwhile, the control unit 180 may set different levels (grades) for each user. Specifically, the control unit 180 may set the first user information corresponding to the first user to a first level and the second user information corresponding to the second user different from the first user to a second level higher than the first level. This may be determined by user settings.

Here, the high level of the user information may mean that the vehicle-related function has a high authority (large).

For example, in the case that vehicle-related screen information is output on the basis of user authentication with user voice, if the user information identified by the user authentication is the first user information, the control unit 180 may perform a vehicle-related function by applying the contents described with reference to FIGS. 9A to 9D.

As another example, in the case that vehicle-related screen information is output on the basis of user authentication with a user voice, if the user information identified by the user authentication is second user information, even if the second graphical object 910b (see FIG. 9B) or the third graphical object 910c (see FIG. 9C), which is associated with a vehicle-related function requiring additional user authentication, is selected, the control unit 180 may perform a function associated with the selected graphical object without additional user authentication (i.e., transmit a control signal corresponding to the function associated with the selected graphical object to the vehicle).

Through such a configuration, the present invention may provide a UI/UX that may more easily control a vehicle through user voice and improve security for vehicle control.

Figure 10A:
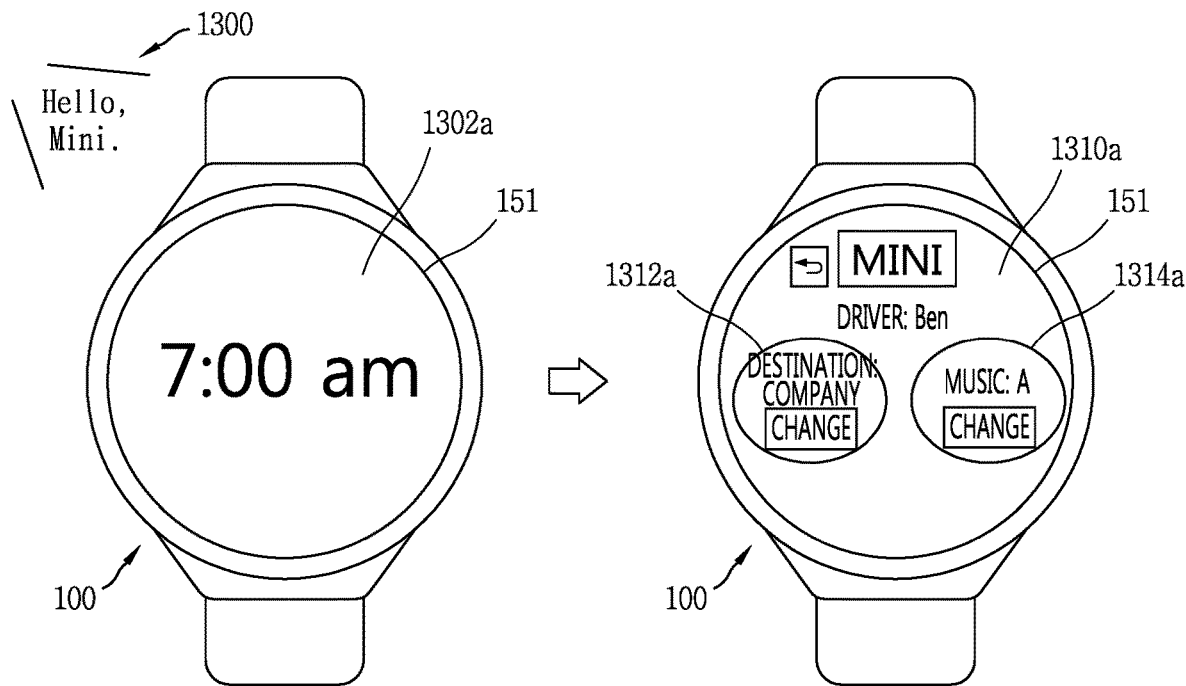
FIGS. 10A and 10B are conceptual diagrams illustrating a method of outputting different vehicle-related screen information according to the current time.
Figure 10B:
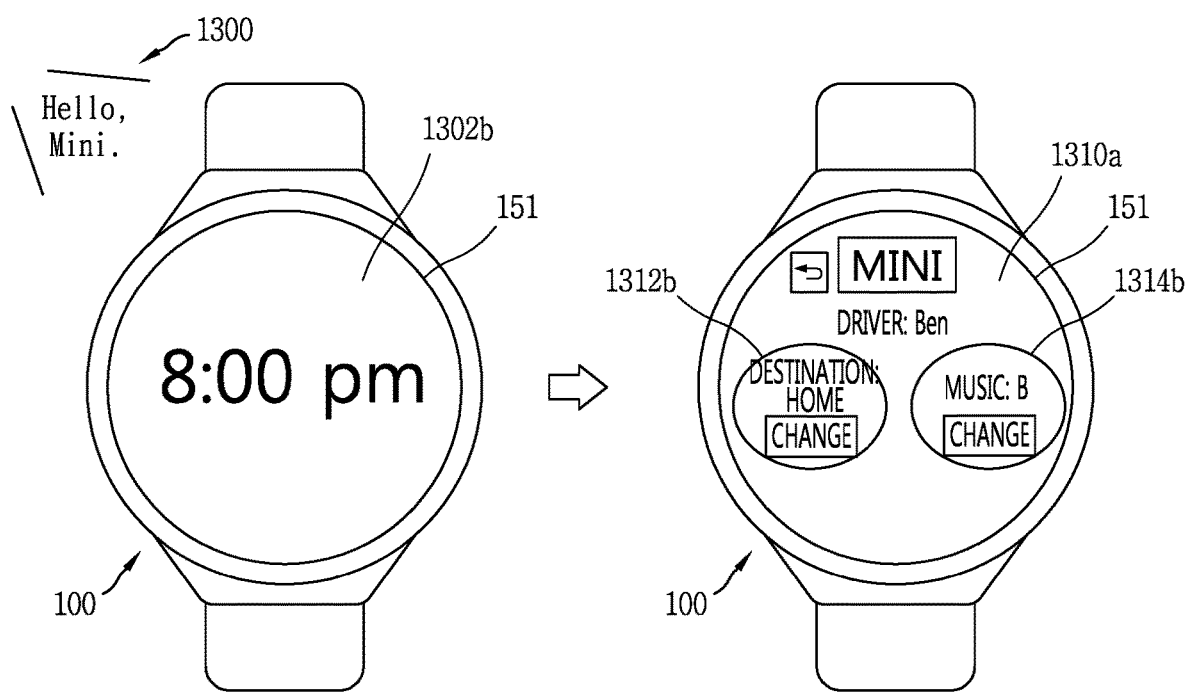

Moreover, in the present invention, different vehicle-related screen information may be output on the basis of the current time. FIGS. 10A and 10B are conceptual diagrams illustrating a method of outputting different vehicle-related screen information according to the current time.

As described above, the control unit 180 of the mobile terminal related to the present invention may output vehicle-related screen information associated with voice information to the display unit 151 on the basis of the voice information corresponding to the user voice.

At this time, even if the voice information corresponding to the user voice is the same, the control unit 180 may output different vehicle-related screen information to the display unit 151 according to the current time.

For example, as shown in the first drawing of FIG. 10A, when the time at which the user voice 1300a is received is the first time 1302a, the control unit 180 may output the first vehicle-related screen information 1310a, as shown in the second drawing of FIG. 10A.

As another example, as shown in the first drawing of FIG. 10B, if the time that the same user voice 1300a as the user voice received at the first time 1302a is received is the second time 1302b different from the first time, the control unit 180 may output the second vehicle-related screen information 1310b to the display unit 151 different from the first vehicle-related screen information 1310a as shown in the second drawing of FIG. 10B.

Specifically, the first vehicle-related screen information 1310*a* may include graphical objects 1312*a* and 1314*a* reflecting the function associated with the first time (or setting, setting value) (e.g., destination, music type). In addition, the second vehicle-related screen information 1310*b* may include graphical objects 1312*b* and 1314*b* reflecting the function associated with the second time (e.g., destination, music type).

Through this configuration, in the present invention, even if the same user voice is received by the same user, by outputting vehicle-related screen information including graphical objects reflecting different functions according to the received time, the user convenience may be remarkably improved.

Also, the mobile terminal related to the present invention may perform various vehicle-related functions using the user voice.

When the user authentication with the user voice is successful, the control unit 180 may enter a mode (or a state) that may be interoperated (communicated) with the vehicle. Entering the mode that may be interoperated with the vehicle may be performed on the basis of the voice information corresponding to the user voice.

A state interoperable with the vehicle means a mode capable of at least one of receiving a signal transmitted from a vehicle, performing a function corresponding to the received signal, and transmitting a signal generated in the mobile terminal to a vehicle.

For example, in a state of entering a mode that may be interlocked with a vehicle, when the vehicle starts running, the control unit 180 may receive information related to the vehicle driving from the vehicle (e.g., the speed of the vehicle, the fuel amount of the vehicle, the estimated time required for reaching the destination, the gas station location information, and the like), and output it to the display unit 151.

As another example, in a state of entering a mode interoperable with the vehicle, if the fuel amount of the vehicle is less than a predetermined amount, the control unit 180 may output route information to a place where the fuel may be charged (e.g., a gas station) to the display unit 151, and on the basis that the distance between the place and the current position of the vehicle falls within a predetermined distance, output notification information (e.g., sound, vibration, screen flicker, etc.).

As another example, in a state of entering a mode interoperable with the vehicle, the control unit 180 may check the heart rate of the user wearing the mobile terminal through the sensing unit 140 (see FIG. 1A), and if the heart rate corresponds to a predetermined number of times (e.g., corresponds to a heart rate corresponding to a drowsy state), transmit a control signal corresponding to a function for preventing drowsiness (e.g., a function for lowering a window, a function for raising the volume of music, a function for vibrating a seat of a vehicle, and so on).

As another example, when the voice information corresponding to the received user voice in a state of entering the mode capable of interoperating with the vehicle includes a keyword related to parking, the control unit 180 may enter the parking mode.

When entering the parking mode, the control unit 180 may store the current location of the vehicle, or may add it to the destination list if the current location is a new destination different from the previously stored destination (or a previously set destination).

In addition, when entering the parking mode, the control unit 180 may transmit the control right for the vehicle to the external terminal. In this case, when transmitting the control right for the vehicle to the external terminal, the control unit 180 preferably sets the control right to be valid only for a preset time.

As described above, the present invention may output the vehicle-related screen information associated with the voice information on the basis of the voice information corresponding to the user voice. Accordingly, the present invention may provide screen information for controlling a desired vehicle more conveniently.

In addition, the present invention may output vehicle-related screen information on the basis that user authentication with a user voice is performed. Further, the present invention may significantly improve security by setting a user authentication condition using a user voice for each vehicle-related function.

In addition, the present invention may provide UI/UX that may utilize the vehicle in an optimized state for each user by providing different vehicle-related screen information on the basis of the user information identified by the user authentication.

Meanwhile, the watch type mobile terminal related to the present invention may transmit a control right capable of controlling a vehicle to an external terminal in order for allowing the vehicle to be controlled by an external terminal. The external terminal may perform at least a portion of a vehicle controllable with the received control right on the basis of receiving the control right.

Here, the control right may be implemented in various forms such as data, information, and a frame. That is, the transmission of the control right capable of controlling the vehicle may be regarded as transmitting data (or information) related to the vehicle, data (or information) authenticated so as to be able to control the vehicle, and the like.

Also, transmitting the control right capable of controlling the vehicle to the external device may mean that the control right is set (granted, registered, granted) to the external terminal, the external terminal is authenticated (registered) by a device (terminal) capable of controlling the vehicle, and the like.

The control right transmitted to the external terminal may be a control right capable of controlling a previously registered vehicle so as to be controllable by the mobile terminal related to the present invention. That is, the vehicle mentioned in the specification may refer to a vehicle controllable by the watch type mobile terminal related to the present invention, that is, a vehicle previously set (registered) in the mobile terminal or a vehicle registered by a user request.

The watch type mobile terminal related to the present invention may transmit a control right capable of controlling a vehicle in various situations to an external terminal. For example, in various situations such as using a valet parking/deputy driving service, using a rental car service, and lending a vehicle to an acquaintance, the control right capable of controlling the vehicle may be transmitted to the external terminal.

Hereinafter, a method of transmitting a control right capable of controlling a vehicle to an external terminal in the present invention will be described in more detail with reference to the attached drawing.

Figure 11:
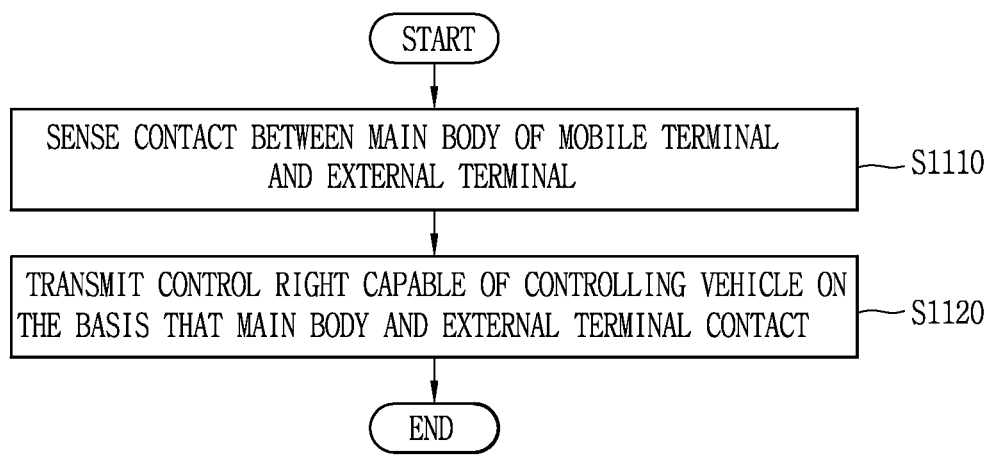
FIG. 11 is a flowchart illustrating a control method according to another embodiment of the present invention.
Figure 12:
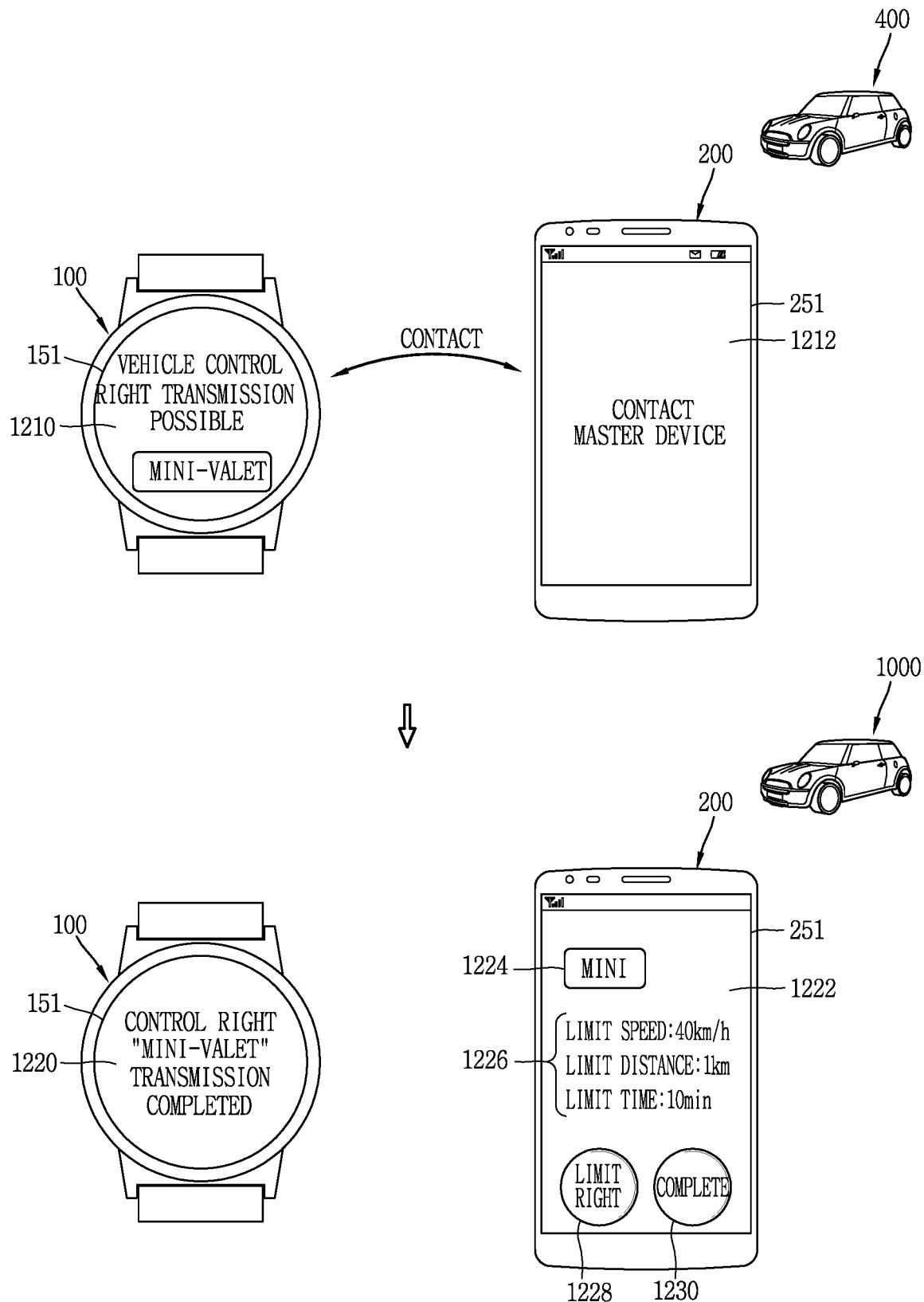
FIG. 12 is a conceptual diagram for describing the control method of FIG. 11.

FIG. 11 is a flowchart typically showing a control method according to another embodiment of the present invention, and FIG. 12 is a conceptual diagram illustrating the control method shown in FIG. 11.

First, the watch type mobile terminal related to the present invention may be set with a control right capable of controlling a vehicle. Specifically, the control unit 180 (see FIG.

1A) may set a control right for controlling functions that may be performed by the vehicle, on the basis of a user request. Here, the control right set to the watch type mobile terminal may be configured to control all functions that may be performed by the vehicle. Accordingly, the control right set to the watch type mobile terminal may be referred to as "Master control right." The control unit 180 may control the vehicle on the basis of the set control right.

Also, the control unit 180 may set (generate) at least one control right capable of controlling the vehicle on the basis of the user's request. The at least one control right may be different. Here, the at least one control right may be a control right to be transmitted to the external terminal.

Specifically, the control unit 180 may set (generate) the at least one control right so that at least a part of the functions that may be performed by the vehicle is limitedly performed. Specifically, the effective time available to control the vehicle, the type of a control-allowed function among functions that may be performed by the vehicle, the maximum speed of the vehicle, and the travel distance (or radius) at which the vehicle may be moved may be pre-set in the at least one control right.

At this time, the at least one control right may be formed differently on the basis of the user setting. For example, when using a valet parking service, the effective time may be set to be short (e.g., 10 minutes) and when using a rent-a-car service, the effective time may be set to a contracted period (e.g., three days) between users.

The at least one control right may be transmitted to an external terminal on the basis of a user request, and the external terminal may control the vehicle on the basis of the transmitted control right.

In this way, the control right (or the control right transmitted to the external terminal) formed to allow at least some functions among functions that may be performed by the vehicle to be performed with restriction may be named as "slave control right." The slave control right may be created (set, changed, controlled, or transmitted) or deleted (expired, invalidated, or expired) by the watch type mobile terminal set with the master control right.

The watch type mobile terminal related to the present invention may transmit a control right (slave control right) capable of controlling a vehicle in various methods to an external terminal.

For example, on the basis of the contact between the main body of the mobile terminal and the external terminal, the control unit 180 may transmit the control right (slave control right) to the external terminal.

Specifically, the watch type mobile terminal related to the present invention may detect an object contacting the main body. Hereinafter, for convenience of explanation, the drawing reference numeral of the main body of the watch type mobile terminal related to the present invention will be described as 100.

Referring to FIG. 11, in the present invention, a step of detecting contact between an object and a main body of a watch type mobile terminal proceeds. Here, the object may be an external terminal. That is, in the present invention, the step of sensing the contact between the main body 100 of the mobile terminal and the external terminal proceeds (S1110).

The watch type mobile terminal related to the present invention may include the sensing unit 140 (see FIG. 1A). The control unit 180 may sense whether the main body 100 and the external terminal are in contact with each other through the sensing unit 140, that is, the contact between the main body 100 and the external terminal.

Specifically, the sensing unit 140 may be configured to detect at least one of that the object is approaching the main body of the watch type mobile terminal, that the object exists within a predetermined distance from the main body, and that the object and the main body are in contact with each other by using at least one of a proximity sensor 141, an illumination sensor 142, a touch sensor, a pressure sensor, a magnetic sensor, a movement sensor, an infrared sensor (IR sensor), an ultrasonic sensor, and an optical sensor (e.g., the camera (see 121)). Referring to FIG. 12, the object may be an external terminal 200 capable of communicating with at least one of the communication unit 110 of the watch-type mobile terminal 100 and the vehicle 1000 (or a telematics terminal provided in the vehicle). Specifically, the external terminal 200 may include a communication unit (e.g., the communication unit 110 described with reference to FIG. 1A) capable of communicating with at least one of the communication unit 110 of the watch type mobile terminal 100 and the vehicle 1000.

The sensing unit 140 may be switched from the inactive state to the active state on the basis that the mobile terminal satisfies predetermined conditions. Specifically, in a state where the sensing unit 140 is kept in the inactive state, the control unit 180 may switch the sensing unit 140 to an active state on the basis that the mobile terminal satisfies the predetermined condition.

The predetermined condition, for example, may be at least one of a state where the mobile terminal 100 is on, a state where the function for controlling the vehicle is executed in the mobile terminal 100 (or a state where the application associated with the function for controlling the vehicle is executed), a state where a control right capable of controlling a vehicle (a function, a step, and a mode) is executed (or entering a state where a control right may be transmitted), and a state where user authentication with biometric information is successful.

Hereinafter, in the present invention, on the basis of the contact between the external terminal and the main body of the mobile terminal, a control right for controlling the vehicle is transmitted to the external terminal (S1120).

Referring to the first drawing of FIG. 12, on the basis that the mobile terminal 100 satisfies a predetermined condition (e.g., on the basis of entering a state where a control right capable of controlling the vehicle may be transmitted), the display unit 151 may display screen information 1210 corresponding to a state where the control right may be transmitted. The screen information 1210 may include information on a control right (control right to be transmitted to an external terminal) set (designated) by a user of the watch type mobile terminal 100.

Further, the control unit 180 may activate the sensing unit 140 on the basis of the satisfaction of the predetermined condition.

Then, the control unit 180 may sense the contact between the main body 100 and the external terminal 200 through the sensing unit 140.

On the basis of the contact between the main body 100 and the external terminal 200, the control unit 180 may transmit a control right capable of controlling the vehicle to the external terminal 200.

Here, in one embodiment, the control unit 180 may emit a signal for identifying the external terminal before the object contacts the main body 100. The signal may be emitted through the communication unit 110 on the basis that the predetermined condition described above is satisfied (e.g., entering a state where a control right capable of controlling the vehicle may be transmitted).

The external terminal 200 may be in a state capable of receiving a signal from the outside. Here, the state may be a state (mode) capable of receiving a control right capable of controlling a vehicle. The state may be entered on the basis of a user request (e.g., an application associated with a function for controlling the vehicle 1000 provided in the external terminal 200 is executed). However, the present invention is not limited to this, and the external terminal 200 may receive a signal received from the outside in a state where the external terminal 200 does not enter a separate state, such as a normal mode or a standby mode.

When a signal for identifying an external terminal is received from the outside, the external terminal 200 may transmit identification authentication information to the watch type mobile terminal 100 on the basis of the signal. Specifically, the signal for identifying the external terminal may include information on a device transmitting the signal (e.g., the watch type mobile terminal 100), and the external terminal 200 may transmit identification authentication information to the device (e.g., the watch type mobile terminal 100) included in the device information on the basis of the device information.

The identification authentication information may include information capable of identifying the external terminal 200. Thereafter, the watch type mobile terminal 100 and the external terminal 200 may be connected to each other through a communication (short-range communication).

Then, if the object contacts the main body 100 after the identification authentication information is received, the control unit 180 of the watch type mobile terminal 100 may identify that the object is the external terminal 200 transmitting the identification authentication information.

Then, the control unit 180 may transmit the control right capable of controlling the vehicle to the external terminal 200 through the communication unit 110. At this time, the communication unit 110 may transmit the control right directly to the external terminal 200 using a short-range communication module 114.

However, the present invention is not limited to this, and the control unit 180 may control the communication unit 110 to transmit the control right to the external terminal 200 through the external server.

In addition, when the external terminal 200 is not identified, the control unit 180 may emit a control right capable of controlling the vehicle when it is detected that the main body 100 is in contact with the object.

In this case, when the object is the external terminal 200, the external terminal 200 may be in a state of being able to receive the control right. Therefore, even in a state where the communication connection is not directly maintained with the mobile terminal 100, the external terminal 200 may receive a control right capable of controlling the vehicle from the mobile terminal after contacting the main body 100 of the mobile terminal.

On the other hand, on the basis that the external terminal 200 enters within the predetermined distance d from the main body, the control unit 180 may control the communication unit 110 to transmit a control right capable of controlling the vehicle 1000 to the external terminal 200. Specifically, the control unit 180 may sense the distance between the main body 100 and the external terminal 200 through the sensing unit 140. Then, on the basis that the external terminal 200 exists within a predetermined distance from the main body 100, the control unit 180 may transmit the control right capable of controlling the vehicle (or the control right scheduled to be transmitted to the external terminal) to the external terminal 200.

That is, on the basis that the external terminal 200 enters (includes) an area (space) 400 using the predetermined distance d as a radius with reference to the main body 100, the control unit 180 may transmit a control right capable of controlling the vehicle 1000 to the external terminal 200.

The predetermined distance d may be determined (set) on the basis of at least one the algorithm previously stored in the control unit, the performance of the sensing unit 140, the communication (short-range communication) available distance between the mobile terminal 100 and the external terminal 200, and the distance set by a user.

Meanwhile, an application associated with the function for controlling the vehicle 1000 may be provided (installed) in the external terminal 200. When the application is executed, the external terminal 200 may enter a state (mode) (i.e., a state capable of receiving a control right) capable of receiving a control right capable of controlling the vehicle from an external device (e.g., the watch type mobile terminal 100). The screen information (or screen information indicating that the control right may be received) 1212 that induces the control right to be received on the basis of the state entry may be displayed on the display unit 251 of the external terminal 200.

Thereafter, as shown in the first drawing of FIG. 12, when the external terminal 200 contacts the main body 100 of the watch type mobile terminal, the control unit 180 of the watch type mobile terminal transmits any one of the control rights preset (registered, designated) to the mobile terminal 100 to the external terminal 200 as shown in the second drawing of FIG. 12.

The any one of the control rights may be a control right (the control right scheduled to be transmitted to an external terminal) set by a user of the watch type mobile terminal 100, as described above.

Herein, when the vehicle is controlled by the external terminal, at least one of the effective time available to control the vehicle, the type of a control-allowed function among functions that may be performed by the vehicle, the maximum speed of the vehicle, and the travel distance at which the vehicle may be moved may be pre-set in the control right to be transmitted to the external terminal 200.

As shown in the second drawing of FIG. 12, notification information 1220 notifying that the control right has been transmitted may be displayed on the display unit 151 of the watch type mobile terminal on the basis of the transmission of the control right. The notification information 1220 may be implemented in various forms, for example, in the form of text, sound, vibration, and the like.

The screen information 1222 related to the control right may be displayed on the display unit 251 of the external terminal 200 on the basis of receiving the control right.

For example, the screen information 1222 related to the control right may include controllable vehicle information 1224, an item 1226 set when the watch type mobile terminal 100 generates the control right (e.g., the effective time available to control the vehicle, the type of a control-allowed function among functions that may be performed by the vehicle, the maximum speed (limit speed) of the vehicle, and the travel distance (radius) at which the vehicle may be moved), a graphical object 1228 associated with the function for requesting a control right to the mobile terminal 100, and a graphical object 1230 associated with the function for terminating the use of the control right received from the mobile terminal 100.

When the external terminal 200 receives the control right from the watch type mobile terminal 100, the vehicle 1000 may be controlled by the external terminal 200. At this time, the vehicle 1000 may be controlled depending on the items set in the control right received by the external terminal 200.

Thereafter, the control right transmitted to the external terminal may be formed to disappear by various methods. For example, the control right transmitted to the external terminal may disappear on the basis that the vehicle 1000 enters a state satisfying predetermined conditions, that the graphical object 1230 associated with the function for terminating the use of the control right displayed on the display unit 251 of the external terminal is selected, and that there is a user request from the mobile terminal 100. The disappearance of the control right means that the control right is expired, the control right is expired, the control right is invalidated, etc., to enter a state where the vehicle is not controlled by the external terminal.

With such a configuration, the present invention provides a control method for controlling a vehicle using an external terminal, thereby improving user convenience. In addition, in the present invention, when the vehicle is controlled by an external terminal, it is possible to provide a UI/UX that allows only a limited function set by a user (owner of the vehicle) to be performed, thereby significantly improving security and convenience.

Hereinafter, various embodiments related to the transmission of a control right capable of controlling a vehicle to an external terminal in a watch type mobile terminal related to the present invention will be described in more detail with reference to the attached drawing.

First, with reference to FIGS. 13A and 13B, a method for generating a control right capable of controlling a vehicle to be transmitted to an external terminal by a watch type mobile terminal related to the present invention will be described.

Figure 13A:
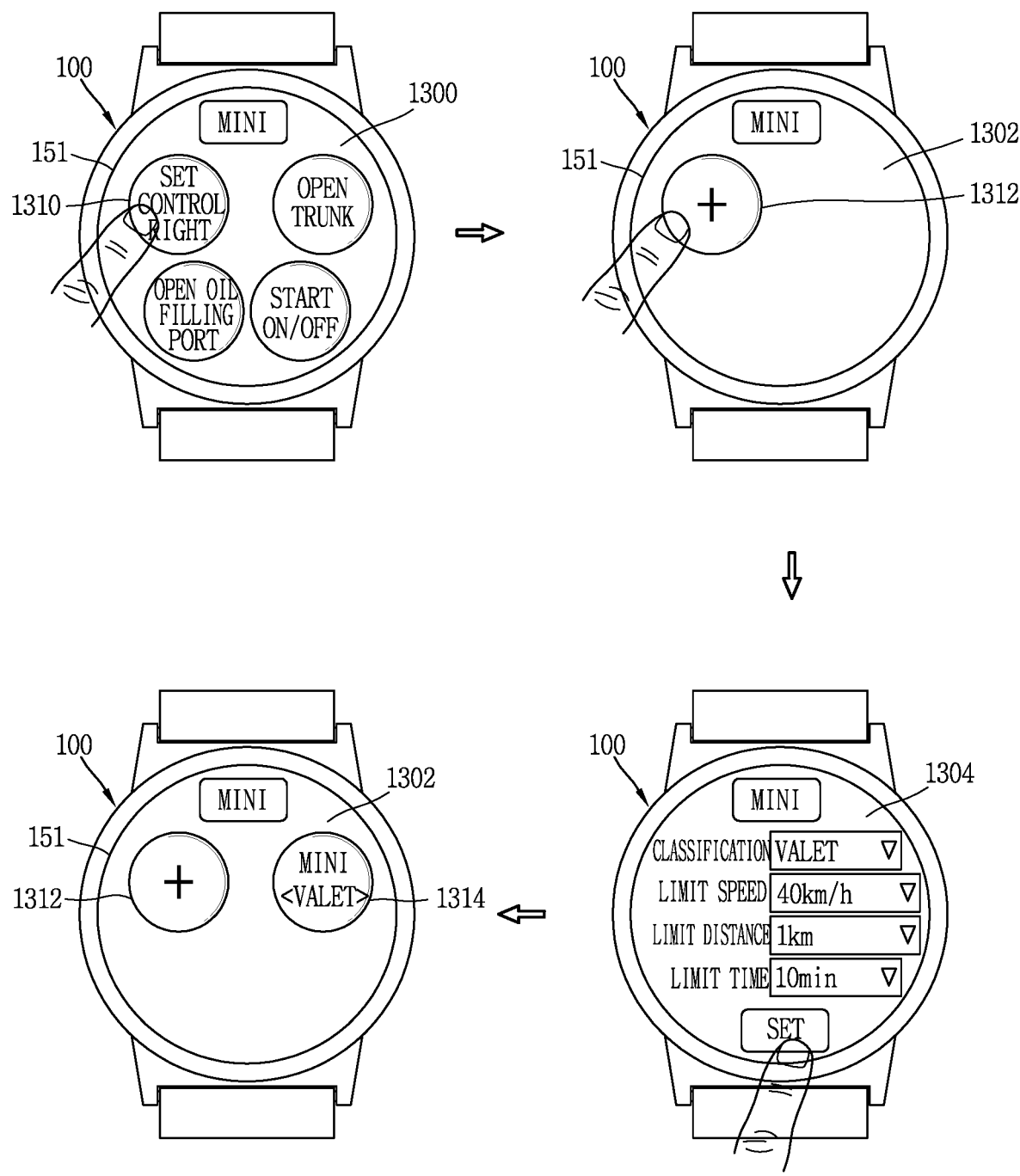
FIGS. 13A and 13B are conceptual diagrams for describing a method of setting a control right capable of controlling a vehicle in a mobile terminal related to the present invention.
Figure 13B:
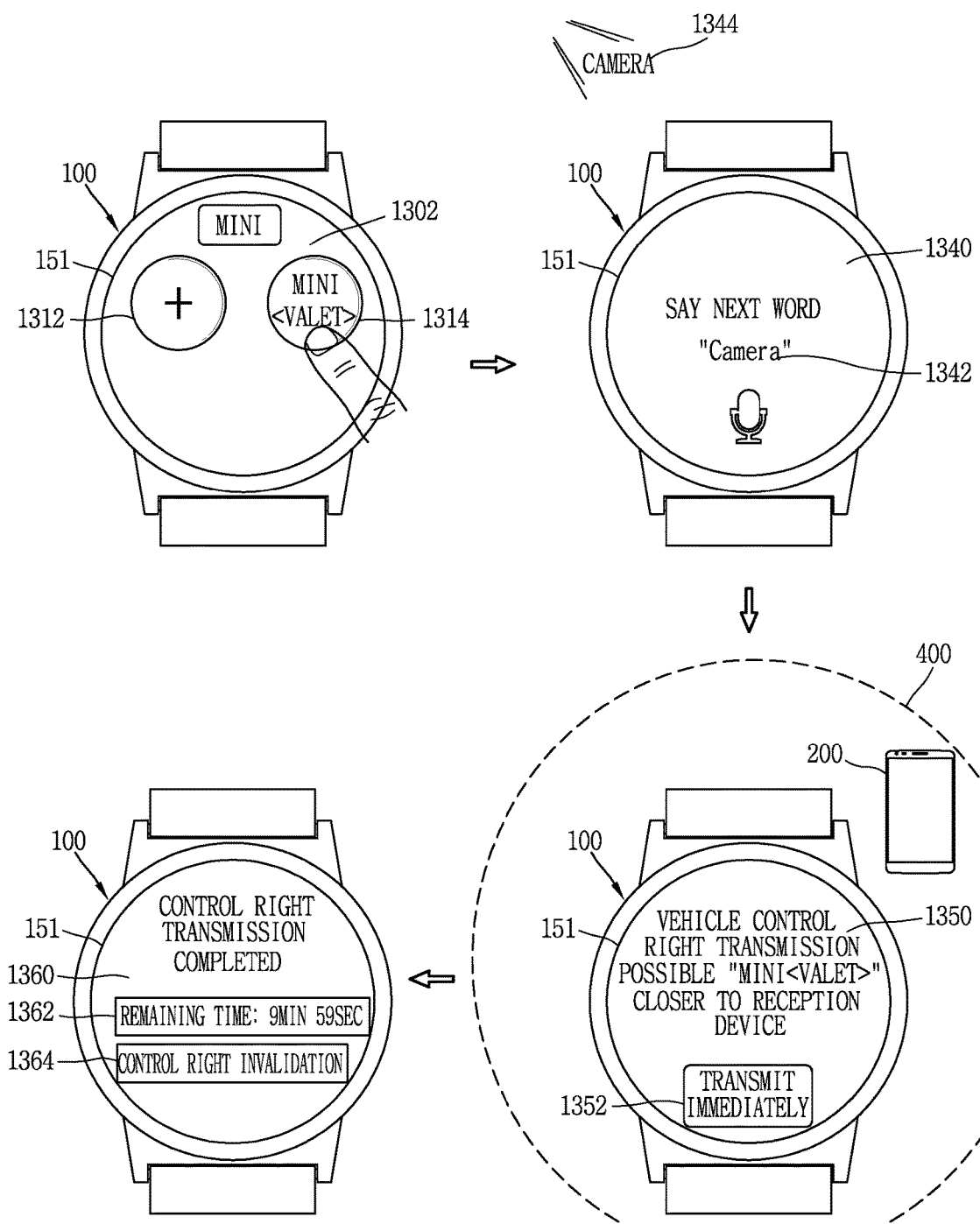

FIGS. 13A and 13B are conceptual diagrams for describing a method of setting a control right capable of controlling a vehicle in a mobile terminal related to the present invention.

As shown in the first drawing of FIG. 13A, vehicle-related screen information 1300 may be displayed on the display unit 151. The vehicle-related screen information 1300 may include at least one graphical object associated with functions executable by the vehicle. When any one of a plurality of graphical objects is selected (touched), in order to allow a function associated with the any one selected graphical object to be performed, the control unit 180 may transmit a control signal corresponding to the associated function to the vehicle 1000 through the communication unit 110.

The vehicle 1000 (or the telematics terminal) may perform a function corresponding to the control signal on the basis of receiving the control signal.

In addition, the screen information 1300 may further include a graphical object 1310 associated with a function for generating a control right to be transmitted to an external terminal.

As shown in the first drawing of FIG. 13A, when the graphical object 1310 is selected, screen information 1302 for notifying the previously generated control right may be output to the display unit 151.

The screen information 1302 may include an icon 1312 for generating (adding) a control right. As shown in the second drawing of FIG. 13A, when the icon 1312 is selected, the control unit 180 may display, on the display unit 151, the screen information 1304 for setting an item (attribute) related to the control right, as shown in the third drawing of FIG. 13A.

A user may set items (functions) to be restricted when the vehicle is controlled by the external terminal by using the graphical objects included in the screen information 1304. For example, when the vehicle is controlled by the external terminal on the basis of a user request through the screen information 1304, the control unit 180 may generate a control right set with at least one of the effective time available to control the vehicle, the type of a control-allowed function among functions that may be performed by the vehicle, the maximum speed of the vehicle, and the travel distance at which the vehicle may be moved. Here, a control right to be transmitted to the external terminal (i.e., a control right with at least some limited functions among the functions that may be performed by the vehicle) may be a slave control right.

Thereafter, as shown in the third drawing of FIG. 13A, when a control right generation button is selected, the control unit 180 may generate a graphical object 1314 associated with a function for transmitting the control right (slave control right) capable of controlling the vehicle, as shown in the fourth drawing in FIG. 13A.

Thereafter, as shown in the first drawing of FIG. 13B, if the graphical object 1314 is selected, the control unit 180 may enter a state where the control right associated with the selected graphical object 1314 may be transmitted.

When entering a state where the control right associated with the selected graphical object 1314 may be transmitted (i.e., a state (mode, standby mode, etc.) where the control right may be transmitted to the external terminal 200), the sensing unit 140 may be switched from the inactive state to the active state as described with reference to FIGS. 11 and 12.

Further, while entering a state where the control right may be transmitted, on the basis of entry of the external terminal 200 within the predetermined distance d from the main body 100 (or within the area (space) 400 having the predetermined distance d as the radius), the control unit 180 may transmit the control right to the external terminal 200.

On the other hand, on the basis of the successful user authentication with biometric information, the control unit 180 may transmit the control right to the external terminal 200. That is, control right transmission to the external terminal 200 may be performed on the basis that user authentication with biometric information is successful.

Herein, the fact that the control right is transmitted on the basis that user authentication with biometric information is successful may include the meaning that the entry to the state where the control right may be transmitted is performed on the basis that user authentication is successful.

The user authentication with the biometric information may include voice recognition, iris recognition, fingerprint recognition, vein recognition, and the like.

For example, the control unit 180 activates a microphone 122, performs voice recognition (authentication) using a user voice received from the outside, or performs fingerprint recognition (authentication) using a fingerprint recognition sensor. Since the method of performing user authentication with biometric information is a general technique, a detailed description thereof will be omitted.

As an example, as shown in the first drawing of FIG. 13B, if a graphical object 1314 associated with a function for transmitting a control right (slave control right) capable of controlling the vehicle is selected, as shown in the second drawing of FIG. 13B, the control unit 180 may display, on the display unit 151, the screen information 1340 for guiding a user to perform the authentication with the biometric information.

If the user authentication with the biometric information is voice recognition using a user voice, the screen information 1340 may include word information 542 for guiding a user voice. In addition, the control unit 180 may activate the microphone 122 to perform voice recognition on the basis of the graphical object 1314 being selected.

Here, when the user authentication with the biometric information is fingerprint recognition, on the basis of the graphical object 1314 being selected, the control unit 180 may activate the fingerprint recognition sensor, and if the user authentication with the biometric information is iris recognition, activate the camera 121.

When the microphone 122 is activated and the user voice 1344 is received, the control unit 180 may perform user authentication with the user voice 1344.

If the user authentication is successful, the control unit 180 may enter a state where the control right may be transmitted, as shown in the third drawing of FIG. 13B. The display unit 151 may display screen information 1350 corresponding to a state where the control right may be transmitted. Specifically, on the basis of the successful user authentication with biometric information, the control unit 180 may control the display unit 151 to display the screen information 1350 corresponding to the state where the control right may be transmitted on the display unit 151.

The screen information 1350 may include at least one of information related to the control right to be transmitted to the external terminal, information for guiding a method for transmitting the control right to an external terminal, and a graphical object 1352 associated with the function for transmitting the control right to an external terminal.

In a state where the screen information 1350 is displayed on the display unit 151 (in a state where control right transmission is possible), when the external terminal 200 enters an area (space) 400 having a predetermined distance from the main body 100 as a radius (or when the external terminal 200 is in contact with the main body 100), the control unit 180 may transmit, to the external terminal 200, a control right capable of controlling the vehicle associated with the graphical object 1314 selected in the first drawing of FIG. 13B. That is, in a state where the screen information 1350 is output to the display unit 151, on the basis that the external terminal 200 enters within a predetermined distance from the main body 100 (or the external terminal 200 and the main body 100 are in contact with each other), the control right may be transmitted.

As another example, if the graphical object 1314 associated with the function for transmitting a control right (slave control right) capable of controlling the vehicle is selected, the control unit 180 may display, on the display unit 151, the screen information 1350 corresponding to the state where the control right may be transmitted.

Thereafter, on the basis that the main body 100 and the external terminal 200 are in contact with each other (or the external terminal 200 exists within a predetermined distance from the main body 100), the control unit 180 may display, on the display unit 151, the screen information for guiding the user authentication with the biometric information. Thereafter, if the user authentication with the biometric information is successful, the control unit 180 may transmit the control right capable of controlling the vehicle to the external terminal 200.

Meanwhile, if the graphical object 1352 included in the screen information 1350 and associated with the function for transmitting the control right is selected, the control unit 180 may transmit the control right to the external terminal. At this time, if the graphical object 1352 is selected, even if the external terminal 200 does not enter within a predetermined distance from the main body (or the main body 100 does not contact the external terminal 200), the control right may be transmitted to the external terminal 200.

In yet another embodiment, on the basis that the graphical object 1352 is selected in a state where the external terminal 200 exists within a predetermined distance from the main body 100, the control unit 180 may transmit the control right to the external terminal 200.

As another example, on the basis that the main body 100 is moved in a predetermined movement in a state where the external terminal 200 exists within a predetermined distance from the main body 100 (a movement that moves in a predetermined manner, a movement that satisfies predetermined conditions), the control unit 180 may transmit the control right to the external terminal 200.

As another example, in a state where the external terminal 200 is in communication (e.g., short-range communication) with the communication unit 110 of the mobile terminal 100, on the basis of at least one of the graphical object 1352 being selected or the main body 100 being moved in a predetermined movement, the control unit 180 may transmit the control right to the external terminal 200.

When the control right is transmitted to the external terminal, the display unit 151 may display screen information 1360 indicating that transmission of the control right is completed. The screen information 1360 includes, for example, an effective time 1362 of a control right transmitted to an external terminal (an effective time at which a vehicle may be controlled by an external terminal), a graphical object 1365 associated with a function (deletion function, invalidation function) of disappearing a control right transmitted to an external terminal, and the like.

If the graphical object 1364 is selected, the control unit 180 may transmit the control signal for disappearing (invalidating) the control right transmitted to the external terminal 200 through the communication unit 110. In this case, the control right transmitted to the external terminal may disappear.

Through such a configuration, in the present invention, security may be improved when a control right capable of controlling a vehicle is transmitted from a watch type mobile terminal to an external terminal.

Hereinafter, various methods through which a watch type mobile terminal related to the present invention transmits a control right capable of controlling a vehicle to an external terminal will be described in more detail with reference to the attached drawing.

FIGS. 14A, 14B, 14C, and 14D are conceptual diagrams for describing various embodiments for transmitting a control right capable of controlling a vehicle to an external terminal from a mobile terminal related to the present invention.

As described above, the control unit 180 of the mobile terminal according to the present invention may detect the contact between the main body 100 and the external terminal 200 through the sensing unit 140. Further, on the basis of the contact between the main body 100 and the external terminal, the control unit 180 may transmit a control right (slave control right) capable of controlling the vehicle to the external terminal 200.

On the other hand, on the basis that the object (external terminal 200) enters within a predetermined distance D from the main body, the control unit 180 may transmit a control right (slave control right) capable of controlling the vehicle to the object (external terminal 200).

Specifically, the control unit 180 may sense the distance between the main body 100 and the external terminal 200 through the sensing unit 140. Then, on the basis that the external terminal 200 exists within a predetermined distance from the main body 100, the control unit 180 may transmit the control right capable of controlling the vehicle (or the control right scheduled to be transmitted to the external terminal) to the external terminal 200.

That is, on the basis that the external terminal 200 enters (includes) an area (space) 400 using the predetermined distance d as a radius with reference to the main body 100, the control unit 180 may transmit a control right capable of controlling the vehicle 1000 to the external terminal 200.

The predetermined distance d may be determined (set) on the basis of at least one the algorithm previously stored in the control unit, the performance of the sensing unit 140, the communication (short-range communication) available distance between the mobile terminal 100 and the external terminal 200, and the distance set by a user.

Figure 14A:
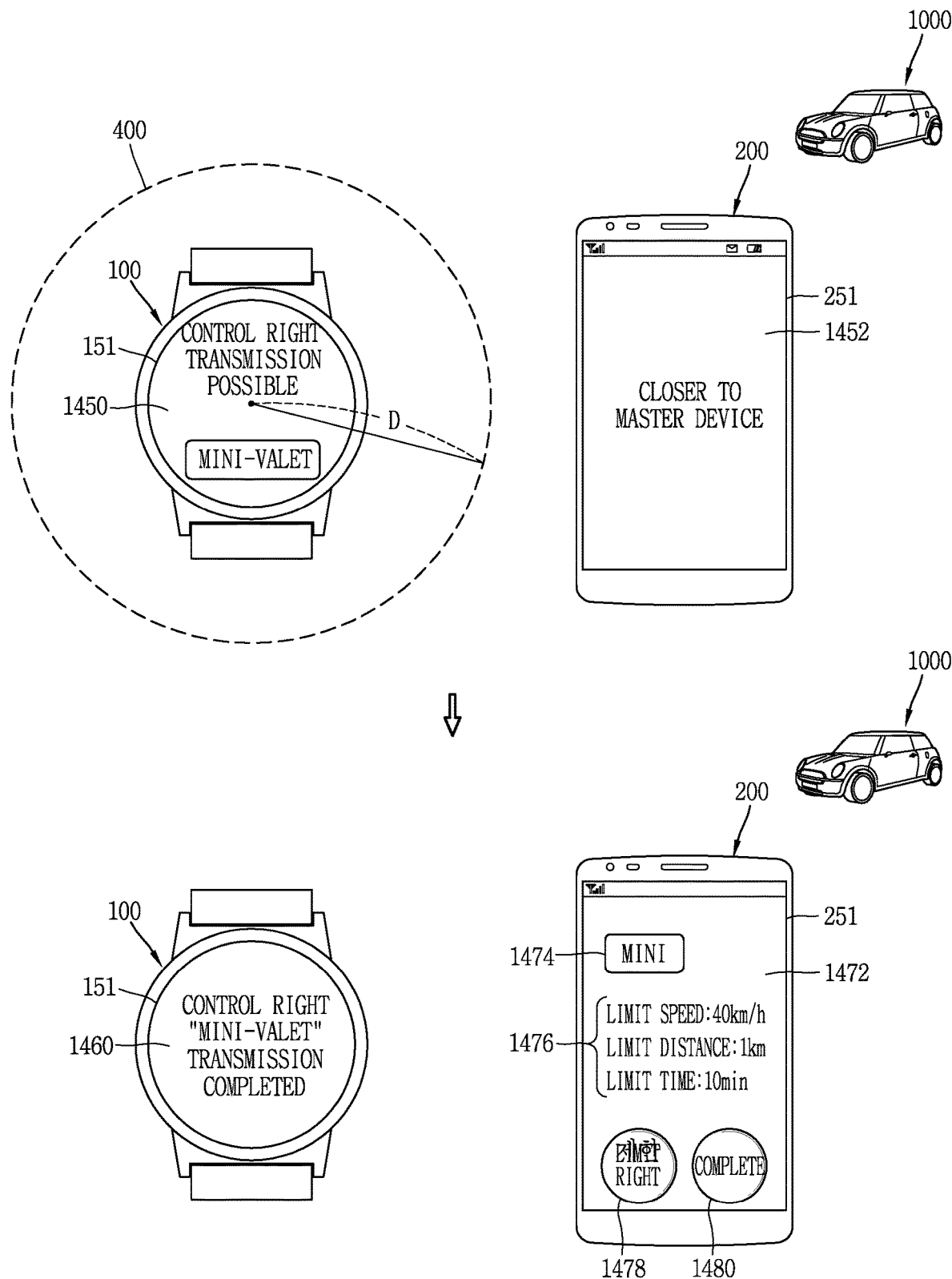
FIGS. 14A, 14B, 14C, and 14D are conceptual diagrams for describing various embodiments for transmitting a control right capable of controlling a vehicle to an external terminal from a mobile terminal related to the present invention.

For example, as shown in the first drawing of FIG. 14A, on the basis that the mobile terminal 100 satisfies a predetermined condition (e.g., on the basis of entering a state where a control right capable of controlling a vehicle may be transmitted), screen information 1450 corresponding to a state where the control right may be transmitted may be displayed on the display unit 151 of the mobile terminal 100. The screen information 1450 may include information on a control right (control right to be transmitted to an external terminal) set (designated) by a user of the watch type mobile terminal 100.

Further, the control unit 180 may activate the sensing unit 140 on the basis of the satisfaction of the predetermined condition.

Also, on the basis of a user request (e.g., an application associated with the function for controlling the vehicle 1000 is executed), the external terminal 200 may enter a state (mode) (i.e., a state for receiving a control right) for receiving a control right capable of controlling the vehicle from an external device (e.g., the watch type mobile terminal 100).

The screen information (or screen information indicating that the control right may be received) 1452 that induces the control right to be received on the basis of the state entry may be displayed on the display unit 251 of the external terminal 200.

Then, the control unit 180 senses the distance between the main body 100 and the external terminal 200, and on the basis that the external terminal 200 exists within a predetermined distance from the main body 100, transmit a control right capable of controlling the vehicle (slave control right scheduled to be transmitted to the vehicle) to the external terminal 200.

As shown in the second drawing of FIG. 14A, notification information 1460 notifying that the control right has been transmitted may be displayed on the display unit 151 of the watch type mobile terminal on the basis of the transmission of the control right. The notification information 1460 may be implemented in various forms, for example, in the form of text, sound, vibration, and the like.

The screen information 1472 related to the received control right may be displayed on the display unit 251 of the external terminal 200 on the basis of receiving the control right.

For example, the screen information 1472 related to the control right may include controllable vehicle information 1474, an item 1476 set when the watch type mobile terminal 100 generates the control right (e.g., the effective time available to control the vehicle, the type of a control-allowed function among functions that may be performed by the vehicle, the maximum speed (limit speed) of the vehicle, and the travel distance (radius) at which the vehicle may be moved), a graphical object 1478 associated with the function for requesting a control right to the mobile terminal 100, and a graphical object 1480 associated with the function for terminating the use of the control right received from the mobile terminal 100. Meanwhile, in a state where the external terminal 200 is within a predetermined distance from the main body 100 (or the external terminal 200 exists within a predetermined distance from the main body 100), on the basis that at least one of the external terminal 200 and the main body 100 is moved to satisfy predetermined conditions, the control unit 180 may transmit a control right capable of controlling the vehicle to the external terminal 200.

Specifically, on the basis that at least one of the external terminal 200 and the main body 100 is moved so as to satisfy predetermined conditions (being moved in a predetermined manner) as soon as the object (external terminal 200) enters (exists) within a predetermined distance from the main body 100, the control right may be transmitted from the watch type mobile terminal 100 to the external terminal 200. That is, on the basis that at least one of the external terminal 200 and the main body 100 is moved with a first movement satisfying a preset condition, the control right may be transmitted to the external terminal 200, and when at least one of the external terminal 200 and the main body 100 is moved with a second movement that does not satisfy a preset condition, the control right may not be transmitted to the external terminal 200.

Hereinafter, an embodiment of a movement (movement of a preset method, preset movement) satisfying predetermined conditions will be described.

The control unit 180 may sense that the external terminal 200 enters within a predetermined distance from the main body 100 (that is, the external terminal 200 and the main body 100 are within a predetermined distance) through the sensing unit 140. The detection may be performed in a state entering a state where the control right (slave control right) set (selected) by a user may be transmitted (e.g., as shown in the first drawing of FIG. 12, in a state where the screen information 1210 corresponding to the state where the control right may be transmitted is displayed on the display unit 151)

Figure 14B:
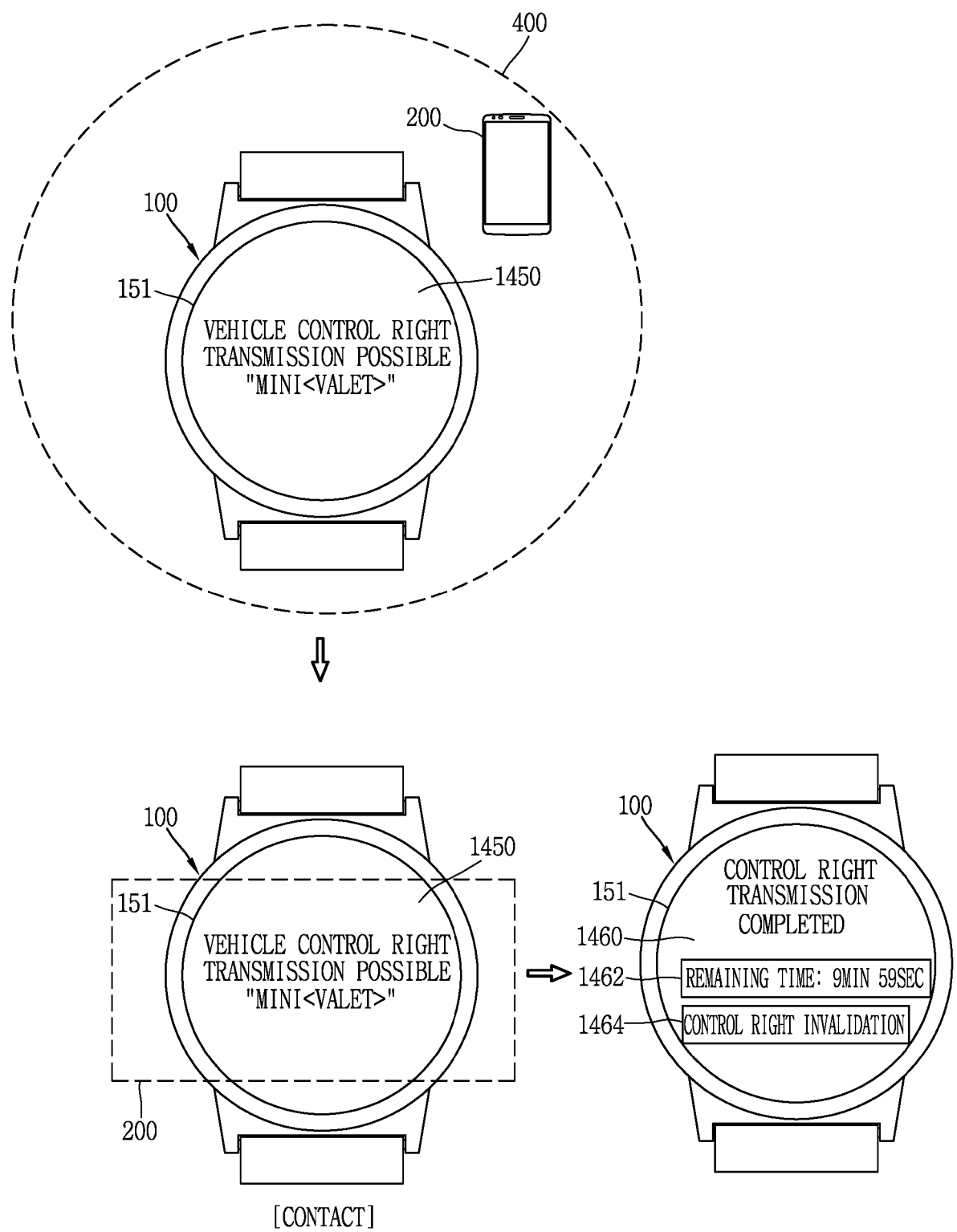

Thereafter, as an example, as shown in the second drawing of FIG. 14B, the control unit 180 may detect that the external terminal 200 contacts the main body 100 (or the display unit 151). In this case, on the basis of the contact, the control unit 180 may transmit a control right (slave control right) capable of controlling the vehicle to the contacted external terminal 200.

Figure 14C:
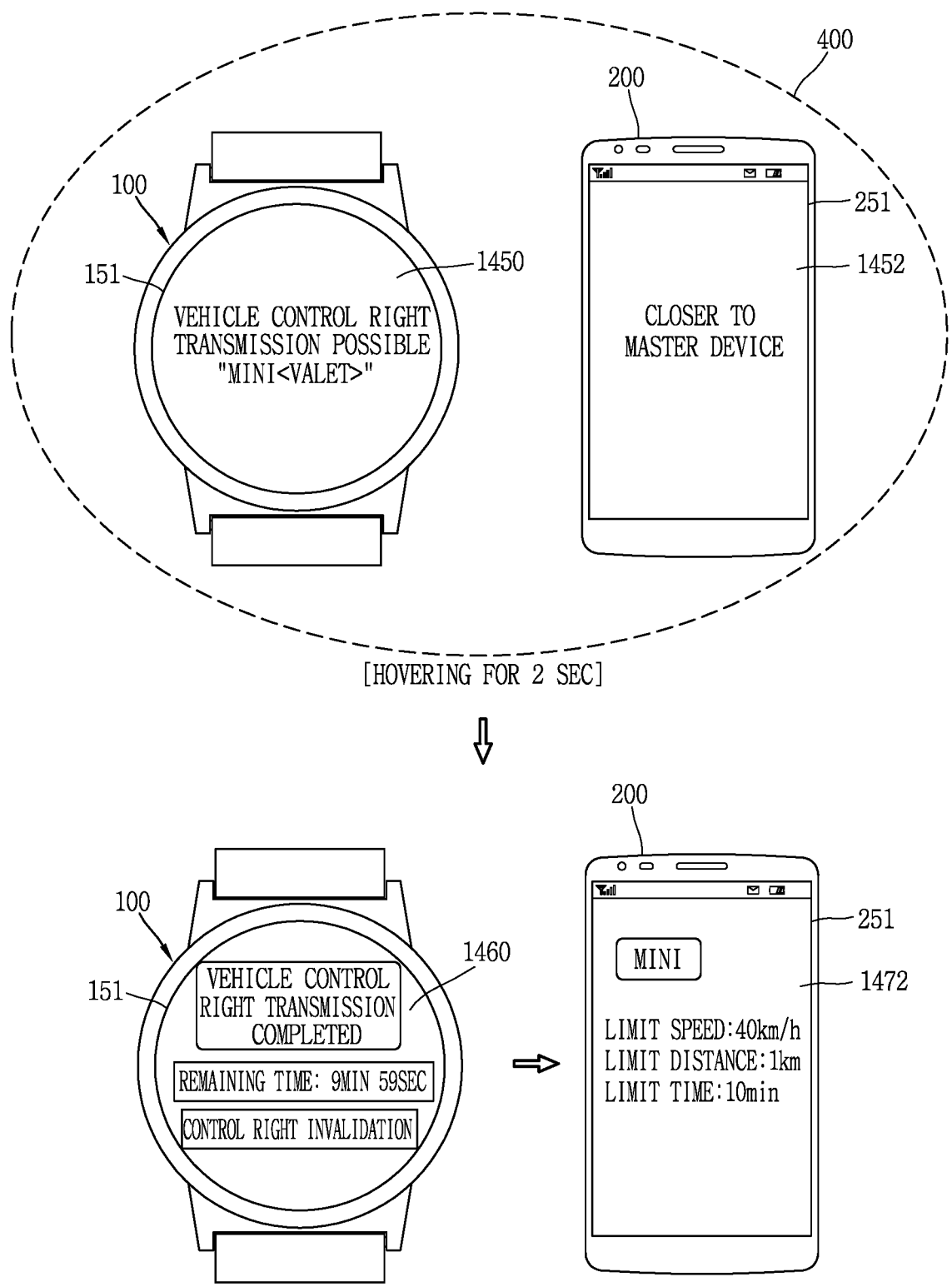
Figure 14D:
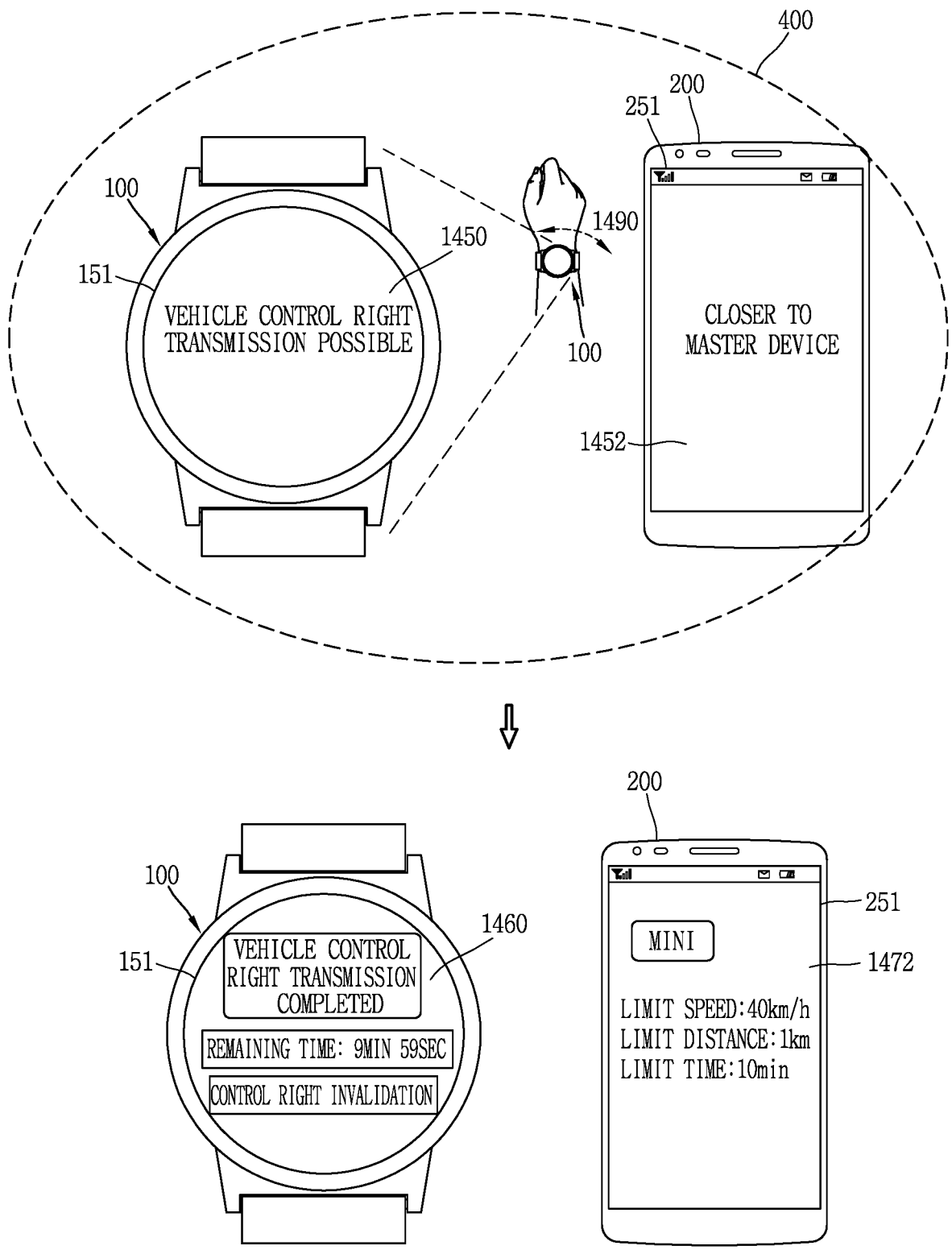

As another example, as shown in the first drawing of FIG. 14C, in a state where the external terminal 200 is within a preset distance from the main body 100 and the external terminal 200 and the main body 100 are within a predetermined distance, the control unit 180 detects that the external terminal 200 is not moved for a preset time at one point within the predetermined distance (e.g., the external terminal 200 is hovered). In this case, on the basis of the detection, as shown in the second drawing of FIG. 14C, the control unit 180 may transmit a control right (slave control right) capable of controlling the vehicle to the external terminal 200.

As another example, the sensing unit 140 may sense a movement of the main body 100 of the watch type mobile terminal. As shown in the first drawing of FIG. 14d, in a state where the external terminal 200 enters within a predetermined distance from the main body 100, a predetermined movement of the main body 100 (or a movement that is moved in a predetermined manner, a movement that meets predetermined conditions) (e.g., a movement that oscillates a certain number of times to the left and right (e.g., a movement that reverses and reinstates a wrist that wears the watch type mobile terminal 100)) and in a state where the display unit 151 is oriented in one direction, a movement 1490 rotated (or moved) in a direction different from the one direction (e.g., a movement to turn the wrist that wears the watch type mobile terminal 100) may be detected through the sensing unit 140. In this case, on the basis of the detection (result), as shown in the second drawing of FIG. 14D, the control unit 180 may transmit a control right (slave control right) capable of controlling the vehicle to the external terminal 200.

Meanwhile, even if the external terminal 200 does not exist within a predetermined distance from the main body 100 (even not in a state where the external terminal 200 does not enter within a predetermined distance from the main body 100), on the basis that the main body 100 is moved in a predetermined motion, the control unit 180 may transmit the control right capable of controlling the vehicle to the external terminal 200.

For example, in a state where short-range communication with the external terminal 200 is possible, on the basis of the main body 100 being moved in a predetermined manner, the control unit 180 may transmit the control right capable of controlling the vehicle to the external terminal 200 through the short-range communication. At this time, the external terminal 200 and the mobile terminal 100 may be in a state where mutual short-range communication is connected or within a distance where short-range communication is possible.

The short-range communication may accomplished on the basis of at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies.

As another example, assuming that user authentication with biometric information is successful, the control unit 180 may transmit the control right capable of controlling the vehicle to the external terminal 200 on the basis that the main body 100 is moved in a predetermined manner. For example, as described with reference to the second drawing of FIG. 13B, assuming that user authentication is successful, the control unit 180 may enter a state where a control right may be transmitted. In this state, on the basis that the main body 100 is moved in a predetermined manner, the control unit 180 may transmit a control right capable of controlling the vehicle to the external terminal 200.

As another example, on the basis of the main body 100 being moved in a predetermined manner, the control unit 180 may display, on the display unit 151, screen information for inducing user authentication with biometric information. Thereafter, if the user authentication with the biometric information is successful, the control unit 180 may transmit the control right capable of controlling the vehicle to the external terminal.

As another example, when the external terminal 200 transmitting the control right is set in advance, on the basis of the main body 100 being moved in a predetermined manner, the control unit 180 may transmit the control right to the external terminal 200 through the communication unit 110. In this case, even if the external terminal 200 is located at a position outside the distance where short-range communication is possible, the control unit 180 may transmit the control right to the external terminal 200 through a mobile communication network (or a server).

On the other hand, although not shown in the drawing, in a state where the external terminal 200 is within a predetermined distance from the main body 100, when the external terminal 200 or the main body 100 is moved in a movement that does not satisfy predetermined conditions, the control unit 180 may output notification information indicating that transmission of the control right is failed.

Through such a configuration, in the present invention, an external terminal to be transmitted by a user may be accurately confirmed, and as a result, it is possible to improve the transmission rate and accuracy of transmitting the control right capable of controlling the vehicle to the external terminal.

Hereinafter, a method of controlling a vehicle after transmitting a control right capable of controlling the vehicle to an external terminal will be described in more detail with reference to the attached drawing.

Figure 15A:
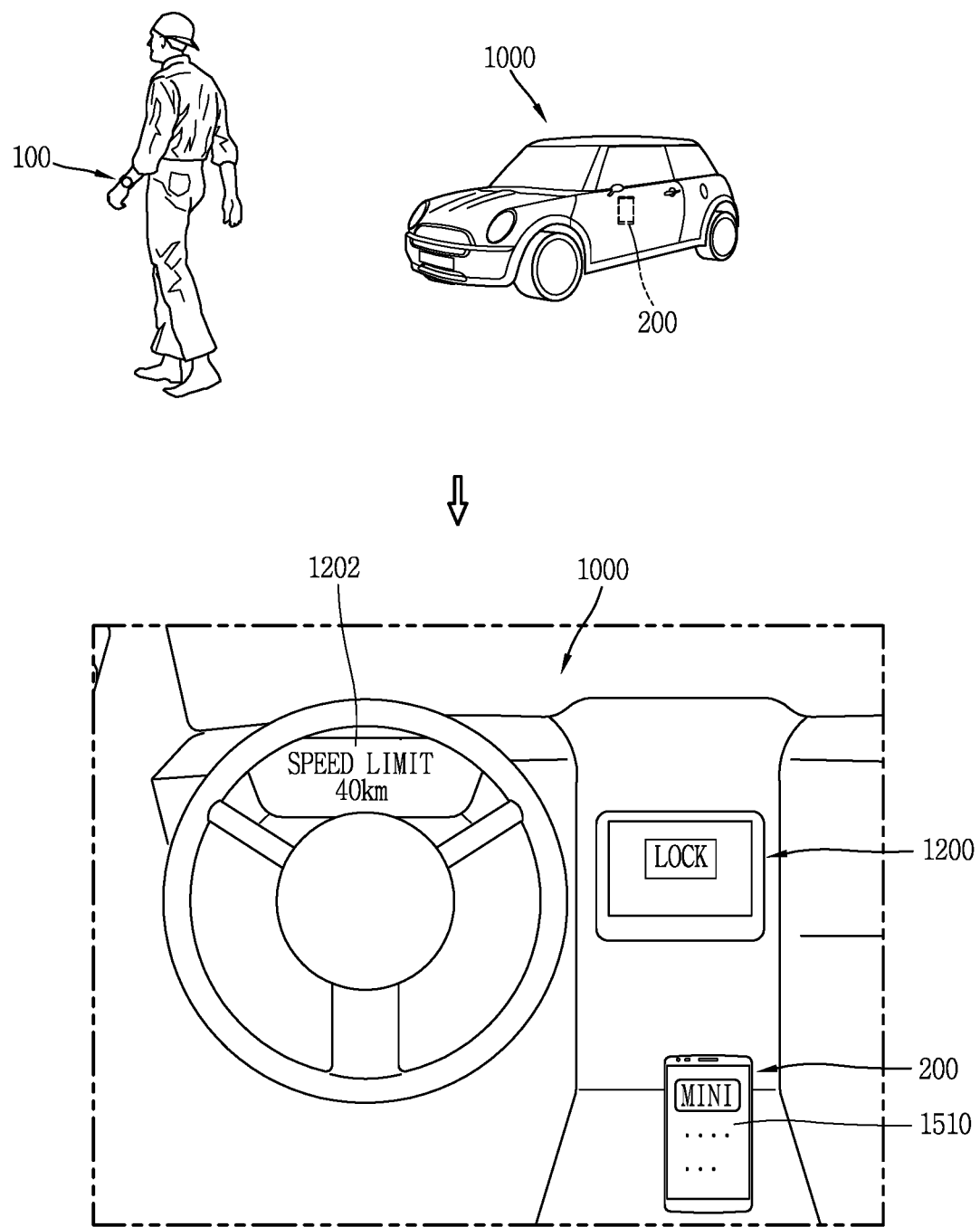
FIGS. 15A, 15B, and 15C are conceptual diagrams illustrating an operation performed by a mobile terminal, an external terminal, and a vehicle after a control right capable of controlling the vehicle is transmitted to the external terminal.
Figure 15B:
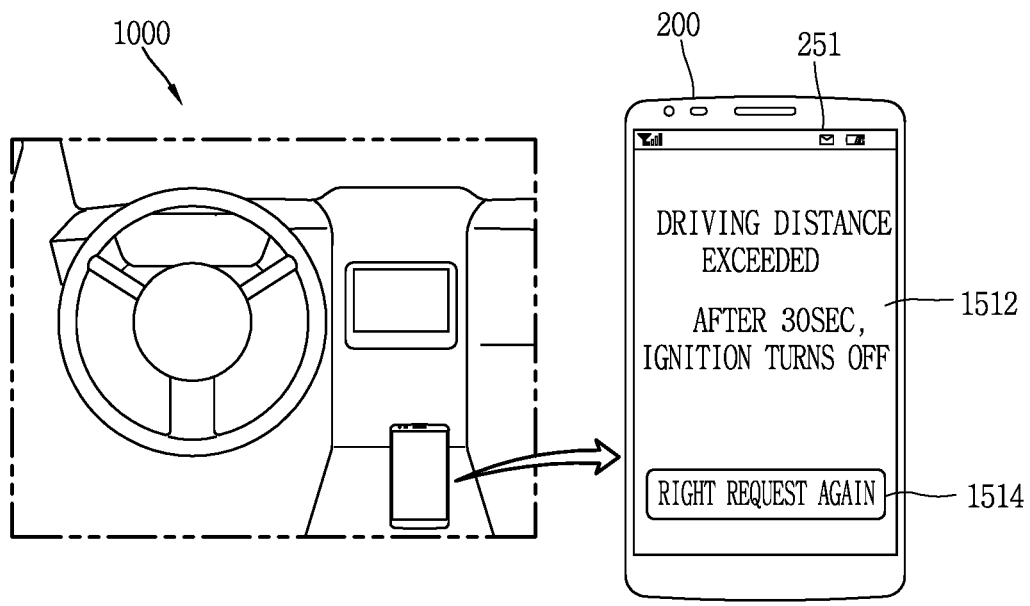
Figure 15B:
Figure 15B:
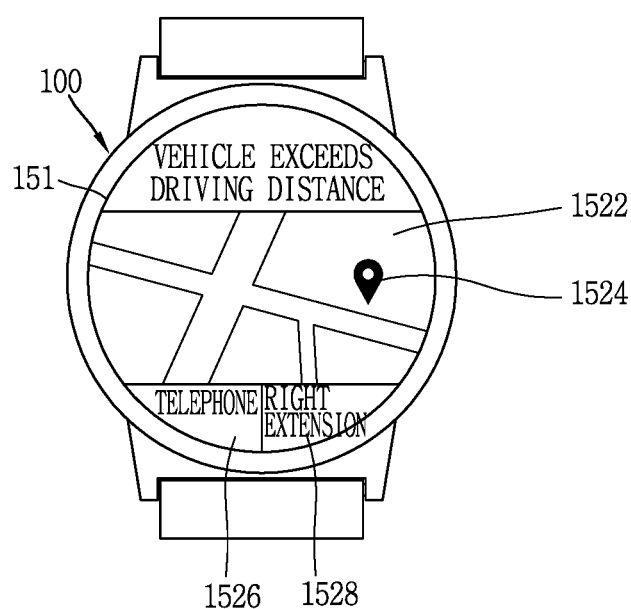
Figure 15C:
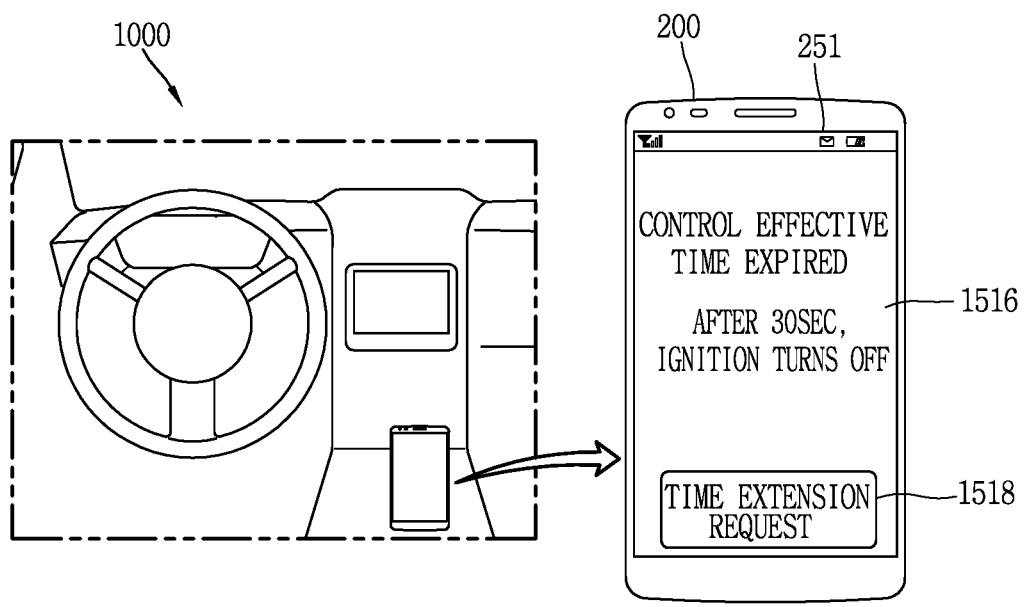
Figure 15C:
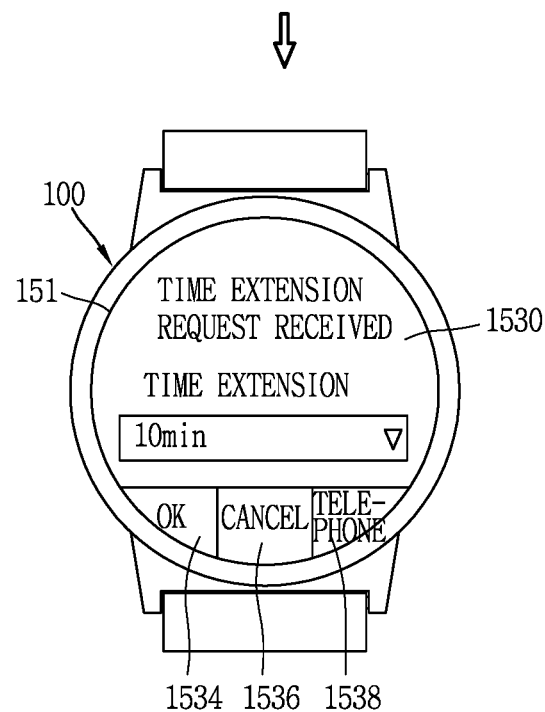

FIGS. 15A, 15B, and 15C are conceptual diagrams illustrating an operation performed by a mobile terminal, an external terminal, and a vehicle after a control right capable of controlling the vehicle is transmitted to the external terminal.

As described above, when the vehicle is controlled by the external terminal, at least one of the effective time available to control the vehicle, the type of a control-allowed function among functions that may be performed by the vehicle, the maximum speed of the vehicle, and the travel distance at which the vehicle may be moved may be pre-set in the control right to be transmitted to the external terminal. In this case, the external terminal 200 may restrictively control at least a part of the functions that may be performed by the vehicle.

For example, it is assumed that an effective time, a maximum speed, and a movement distance are limited and non-driving functions (e.g., a control function of a navigation module, a camera, a black box, and a seat adjustment provided in the vehicle, an opening and closing function of a box part for storage, a trunk, and a gas filling port, and so on) are disabled in the control right transmitted to the external terminal 200.

When transmitting the control right capable of controlling the vehicle to the external terminal 200, the control unit 180 of the watch type mobile terminal related to the present invention may transmit the control right (or the information corresponding to the control right) to the vehicle 1000 also. The vehicle 1000 may limit at least some of the functions that may be performed by the vehicle, on the basis of the control right.

For example, when the vehicle 1000 receives the control right from the mobile terminal 100, the vehicle 1000 may reflect the items set in the control right. For example, the navigation module (or the display unit) 1200 of the vehicle may display screen information indicating that use is restricted. In addition, information 1202a on the maximum speed set in the control right may be displayed on the instrument panel of the vehicle.

Moreover, the maximum speed information 1202a may be output when the traveling speed of the vehicle exceeds the maximum speed by the user of the external terminal. When the accelerator is pushed so that the traveling speed of the vehicle exceeds the maximum speed, the vehicle 1000 may not travel more than the maximum speed.

Meanwhile, when the attempt to travel at a speed higher than the maximum speed is repeated a predetermined number of times (or time), the vehicle 1000 may transmit information related to the traveling speed of the vehicle to the mobile terminal 100.

On the other hand, referring to FIG. 15B, when the vehicle 1000 is controlled by the external terminal 200 and the travel distance of the vehicle 1000 exceeds the travel distance set in the control right (or exceeds the travel radius), the display unit 151 of the external terminal 200 may display the screen information 1512 indicating that the control right of the vehicle is out of service. The screen information 1512 may be output by a control unit of an external terminal or a control of a vehicle.

Thereafter, the vehicle 1000 may be turned off so that the vehicle may not travel after a predetermined time elapses.

The screen information 1512 may include a graphical object 1514 associated with a function for requesting a control right to the terminal transmitting the control right (watch type mobile terminal 100). If the graphical object 1514 is selected, the external terminal 200 may transmit a signal of requesting a control right (or extension of control right) to the watch type mobile terminal 100.

Meanwhile, when the travel distance of the vehicle 1000 exceeds the travel distance set in the control right, at least one of the vehicle 1000 and the external terminal 200 may transmit information related to the travel distance of the vehicle to the mobile terminal 100.

In this case, the display unit 151 of the mobile terminal 100 may include information indicating that the vehicle exceeds the travel distance set in the control right, map information 1522, location information 1524 of the vehicle, a graphical object 1526 associated with a function for making a call to the external terminal 200, and a graphical object 1528 associated with a function for transmitting a control right to the external terminal 200.

Although not shown in the drawing, if a graphical object 1514 associated with the function for requesting the control right is selected, the screen information 1530 informing that there is a request for a control right from the external terminal 200 may be output to the display unit 151 of the mobile terminal 100. For example, the screen information 1530 may include a graphical object 1532 for setting an effective time available to control the vehicle, a graphical object 1534 associated with a function for transmitting a control right, and a graphical object 1538 associated with a cancel button and a telephone function. If the graphical object 1534 associated with the function for transmitting the control right is selected, the control unit 180 may transmit the control right to at least one of the external terminal 200 and the vehicle 1000 again.

As another example, referring to FIG. 15C, when the vehicle 1000 is controlled by the external terminal 200 and an effective time available to control the vehicle 1000 elapses, the display unit 151 of the external terminal 200 may display the screen information 1516 indicating that the control right of the vehicle is out of service. The screen information 1516 may be output by a control unit of an external terminal or a control of a vehicle.

Thereafter, the vehicle 1000 may be turned off so that the vehicle may not travel after a predetermined time elapses. The effective time available to control the vehicle may be measured on the basis of a time point at which the control right is transmitted from the mobile terminal 100 to the external terminal 200, for example.

The screen information 1516 may include a graphical object 1518 associated with a function for requesting a control right to the terminal transmitting the control right (watch type mobile terminal 100). If the graphical object 1518 is selected, the external terminal 200 may transmit a signal of requesting a control right (or extension of control right) to the watch type mobile terminal 100.

In this case, the display unit 151 of the mobile terminal 100 may output screen information 1530 informing that there is a request for a control right from the external terminal 200. For example, the screen information 1530 may include a graphical object 1532 for setting an effective time available to control the vehicle, a graphical object 1534 associated with a function for transmitting a control right, and a graphical object 1538 associated with a cancel button and a telephone function. If the graphical object 1534 associated with the function for transmitting the control right is selected, the control unit 180 may transmit the control right to at least one of the external terminal 200 and the vehicle 1000 again.

Although not shown in the drawing, as described above, if the effective time available to control the vehicle 1000 elapses, at least one of the vehicle 1000 and the external terminal 200 may transmit information related to the effective time available to control the vehicle to the mobile terminal 100.

In this case, the display unit 151 of the mobile terminal 100 may include information indicating that the vehicle exceeds the travel distance set in the control right, map information, location information of the vehicle, a graphical object associated with a function for making a call to the external terminal 200, and a graphical object associated with a function for transmitting a control right to the external terminal 200.

The control of the vehicle 1000 by the external terminal 200 may be performed in various manners. For example, in a state where a control right capable of controlling the external terminal 200 is received, if the vehicle 1000 is within a predetermined distance, the vehicle 1000 may operate.

Through such a configuration, if the vehicle is controlled through an external terminal, the present invention may provide a UI/UX through which a user of a mobile terminal may receive a controlled state of a vehicle in real time.

On the other hand, the control right transmitted to the external terminal may disappear in various ways.

Figure 16:
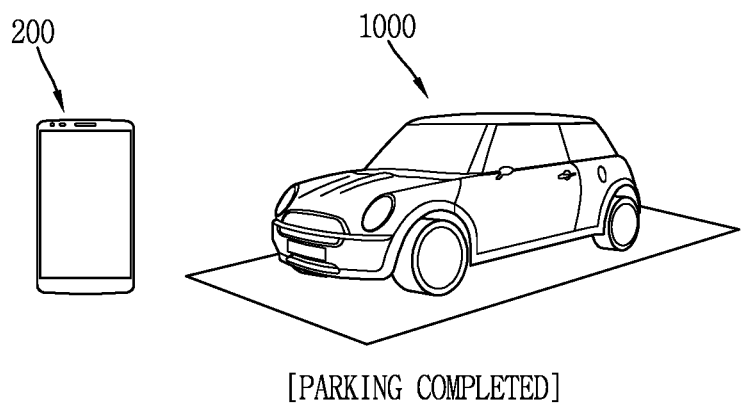
FIG. 16 is a conceptual diagram for describing an embodiment in which a control right transmitted to an external terminal disappears.
Figure 16:
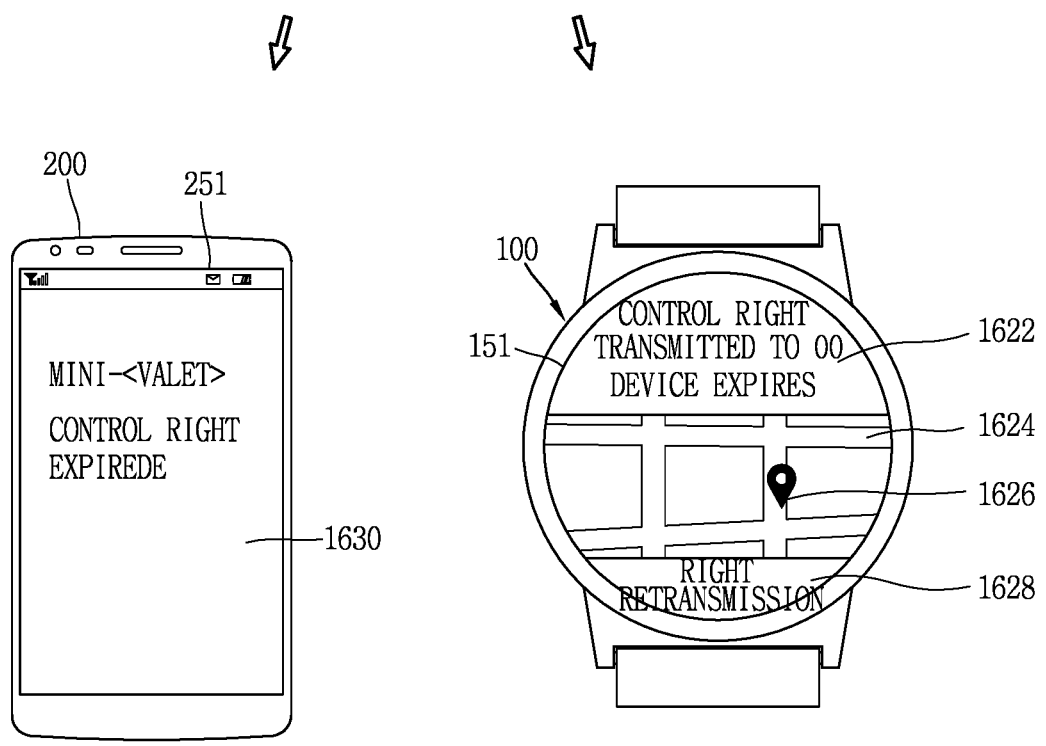

FIG. 16 is a conceptual diagram for describing an embodiment in which a control right transmitted to an external terminal disappears.

On the basis of satisfying the predetermined condition, the control right transmitted to the external terminal may disappear from at least one of the external terminal and the vehicle. The disappearance of the control right may be referred to as that the control right is expired, the control right is invalidated, and so on.

For example, as shown in the third drawing of FIG. 13B, on the basis of the selection of the graphical object 1364 associated with a function (deletion function, invalidation function) for disappearing the control right transmitted to the external terminal displayed on the display unit 151 of the mobile terminal 100, the control right transmitted to the external terminal (or vehicle) may disappear. Specifically, when the graphical object 1364 is selected, the control unit 180 may transmit a signal for invalidating the control right to the external terminal 200.

As another example, as shown in the second drawing of FIG. 13B, on the basis of the selection of the graphical object 1230 associated with a function for terminating the use of the control right displayed on the display unit 251, the control right transmitted to the external terminal may disappear.

As another example, as shown in FIG. 16, the control right transmitted to the external terminal is formed to disappear from the external terminal 200 on the basis that the vehicle 1000 enters a state satisfying predetermined conditions.

For example, on the basis of at least one of that the vehicle is parked, that the vehicle is turned off, or that a predetermined time elapses after the vehicle is turned off, the control right transmitted to the external terminal 200 may disappear from the external terminal 200.

When the control right disappears from the external terminal 200, the external terminal 200 may transmit a signal indicating that the control right disappears to at least one of the mobile terminal 100 and the vehicle 1000.

In this case, the display unit 151 of the mobile terminal 100 may display information 822 indicating that the control right transmitted to the external terminal disappears, map information 1624, vehicle location information 1626, and a graphical object 1626 associated with a function for transmitting a control right to an external terminal again.

In addition, the display unit 251 of the external terminal 200 may display information 1630 informing that the control right disappears. Although not shown in the drawing, the display unit 251 of the external terminal 200 may further display a graphical object associated with the function for requesting the control right to the mobile terminal 100 again.

As described above, on the basis of the contact between the external terminal and the main body (or the presence of the external terminal and the main body within a predetermined distance), the present invention may transmit a control right capable of controlling a vehicle to the external terminal. Accordingly, the present invention may provide a user interface that may transmit a control right to an external terminal, which allows the user to more easily control the vehicle.

In addition, the present invention may be configured to perform only some of the functions that may be performed in the vehicle, or may transmit a control right configured to set additional restrictions on the functions that may be performed to the external terminal. Therefore, according to the present invention, when a vehicle is controlled by an external terminal, it is possible to provide a control method for controlling only functions desired by the user among the functions that may be performed in a vehicle to be performed by the external terminal.

In addition, the present invention may significantly improve security by transmitting a control right to an external terminal on the basis that user authentication with biometric information is successful.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A mobile terminal comprising:
a main body wearable on a wrist;
a communicator provided in the main body;
a sensor configured to sense a contact between the main body and an external terminal and to sense a distance between the main body and the external terminal;
a display; and
a controller configured to:
determine that a contact between the main body and the external terminal has occurred based on information obtained from the sensor;
based on the determination that the contact between the main body and the external terminal has occurred, control the communicator to transmit a control right that enables the external terminal to control a vehicle;
authenticate a user of the mobile terminal based on biometric information;
based on the user of the mobile terminal being authenticated, display, on the display, a graphical object for transmitting the control right; and
in response to the graphical object being selected, control the communicator to transmit the control right to the external terminal without requiring the determination that the contact between the main body and the external terminal has occurred,
wherein the controller is further configured to transmit the control right to the external terminal based on a determination that the external terminal exists within a predetermined distance from the main body.

2. The mobile terminal of claim 1,
wherein the external terminal is able to communicate with at least one of the communicator and the vehicle,
wherein when the vehicle is controlled by the external terminal, at least one of an effective time available to control the vehicle, a type of a control-allowed function among functions executable by the vehicle, a maximum speed of the vehicle, and a movement distance at which the vehicle is able to move is preset in the control right transmitted to the external terminal.

3. The mobile terminal of claim 2, wherein the control right transmitted to the external terminal disappears from the external terminal on the basis that the vehicle enters a state of satisfying a predetermined condition.

4. The mobile terminal of claim 1, wherein the control right transmission to the external terminal based on the determination that the contact between the main body and the external terminal has occurred is further based on the user of the mobile terminal being authenticated.

5. The mobile terminal of claim 4,
wherein based on the user of the mobile terminal being authenticated, the controller controls the display to display screen information indicating a state where the transmission of the control right is possible on the display.

6. The mobile terminal of claim 5, wherein while the screen information is being output to the display, the control right is transmitted based on the determination that the contact between the main body and the external terminal has occurred.

7. The mobile terminal of claim 1, wherein in a state where the external terminal exits within the predetermined distance from the main body, the controller transmits the control right to the external terminal on the basis that at least one of the external terminal and the main body is moved to satisfy a predetermined condition.

8. The mobile terminal of claim 7, wherein the control right is transmitted to the external terminal on the basis that at least one of the external terminal and the main body is moved with a first movement satisfying a predetermined condition and is not transmitted to the external terminal when at least one of the external terminal and the main body is moved with a second movement that does not satisfy a predetermined condition.

9. A mobile terminal comprising:
a main body wearable on a wrist;
a communicator configured to perform short-range communication with an external terminal;
a sensor configured to sense a movement of the main body and to sense a distance between the main body and the external terminal; and
a controller configured to:
determine that a contact between the main body and the external terminal has occurred based on information obtained from the sensor;
based on the determination that the contact between the main body and the external terminal has occurred, transmit a control right that enables the external terminal to control a vehicle through short-range communication on the basis that the main body is moved in a predetermined manner;
authenticate a user of the mobile terminal based on biometric information;
based on the user of the mobile terminal being authenticated, display, on the display, a graphical object for transmitting the control right; and
in response to the graphical object being selected, control the communicator to transmit the control right to the external terminal without requiring the determination that the contact between the main body and the external terminal has occurred,
wherein the controller is further configured to transmit the control right to the external terminal based on a determination that the external terminal exists within a predetermined distance from the main body.

10. The mobile terminal of claim 9, wherein the short-range communication is performed on the basis of at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies.

11. A control method of a mobile terminal, the control method comprising:
determining that a contact between a main body of the mobile terminal and an external terminal has occurred based on information obtained from a sensor of the mobile terminal;
based on the determination that the contact between the main body and the external terminal has occurred, transmitting a control right that enables the external terminal to control a vehicle;
authenticating a user of the mobile terminal based on biometric information;
based on the user of the mobile terminal being authenticated, displaying, on a display of the mobile terminal, a graphical object for transmitting the control right; and
in response to the graphical object being selected, transmitting the control right to the external terminal without requiring the determination that the contact between the main body and the external terminal has occurred;
wherein the sensor is configured to sense a distance between the main body and the external terminal, and
wherein the control method further comprises transmitting the control right to the external terminal based on a determination that the external terminal exists within a predetermined distance from the main body.

* * * * *